US012797715B2

(12) United States Patent
Fukazawa et al.

(10) Patent No.: US 12,797,715 B2
(45) Date of Patent: Nov. 17, 2026

(54) PRIZE ACQUISITION GAME MACHINE

(71) Applicant: SEGA CORPORATION, Tokyo (JP)

(72) Inventors: Mitsuharu Fukazawa, Tokyo (JP); Takaya Goshozono, Tokyo (JP); Akira Wakou, Tokyo (JP); Yasuhito Yano, Tokyo (JP); Shinya Ono, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 245 days.

(21) Appl. No.: 18/740,861

(22) Filed: Jun. 12, 2024

(65) Prior Publication Data

US 2024/0325875 A1 Oct. 3, 2024

Related U.S. Application Data

(63) Continuation of application No. PCT/JP2022/046187, filed on Dec. 15, 2022.

(30) Foreign Application Priority Data

Dec. 28, 2021 (JP) ................................ 2021-214541

(51) Int. Cl.
*A63F 9/30* (2006.01)
*G07F 17/32* (2006.01)

(52) U.S. Cl.
CPC ............ *A63F 9/30* (2013.01); *G07F 17/3206* (2013.01); *G07F 17/3211* (2013.01);
(Continued)

(58) Field of Classification Search
CPC .... A63F 9/30; G07F 17/3206; G07F 17/3211; G07F 17/3227; G07F 17/3253; G07F 17/3297
(Continued)

(56) References Cited

U.S. PATENT DOCUMENTS

2006/0094489 A1* 5/2006 Fukazawa ................. A63F 9/24 463/7
2006/0170164 A1* 8/2006 Watanabe ............. G07F 11/165 273/447
2007/0013139 A1* 1/2007 Kumagai ............ G07F 17/3253 273/448

FOREIGN PATENT DOCUMENTS

JP 2009-183554 A 8/2009
JP 2009-207711 A 9/2009
(Continued)

OTHER PUBLICATIONS

International Search Report issued in corresponding International Application No. PCT/JP2022/046187 mailed Feb. 14, 2023 (5 pages).

(Continued)

*Primary Examiner* — Thomas M Sember
(74) *Attorney, Agent, or Firm* — Osha Bergman Watanabe & Burton LLP

(57) ABSTRACT

A prize acquisition game machine includes: a prize display unit comprising a housing that accommodates prizes in a game space within the housing; a prize acquisition device comprising arms and is configured to move around the game space and grab at least one of the prizes with the arms; a controller that controls movement of the prize acquisition device; and a storage that stores movement information on past movement of the prize acquisition device in the game space. The controller is configured to control the movement of the prize acquisition device based on the movement information stored in the storage.

11 Claims, 18 Drawing Sheets

(52) U.S. Cl.
CPC ...... *G07F 17/3227* (2013.01); *G07F 17/3253* (2013.01); *G07F 17/3297* (2013.01)

(58) Field of Classification Search
USPC .......................................... 273/440, 447–448
See application file for complete search history.

(56) References Cited

FOREIGN PATENT DOCUMENTS

| | | | |
|---|---|---|---|
| JP | 2013-59572 | A | 4/2013 |
| JP | 6307721 | B2 | 4/2018 |

OTHER PUBLICATIONS

Written Opinion issued in corresponding International Application No. PCT/JP2022/046187 mailed Feb. 14, 2023 (4 pages).

* cited by examiner

PRIZE ACQUISITION GAME MACHINE

BACKGROUND

Technical Field

The present invention relates to a prize acquisition game machine, also known as a "claw machine."

Description of Related Art

There are conventional prize acquisition game machines comprising a prize accommodating unit, a prize acquisition unit, a hanging member for hanging the prize acquisition unit, a raising and lowering means for moving the prize acquisition unit up and down, a lift biasing means for biasing the prize acquisition unit in the lifting direction, a lift biasing force changing means for changing the biasing force of the lift biasing means, a movement means for moving the prize acquisition unit in the horizontal direction, a control means for controlling the horizontal movement and the raising and lowering of the prize acquisition unit, an operation means for allowing a player to manipulate the horizontal movement of the prize acquisition unit, and a descent stoppage means for stopping the descent of the prize acquisition unit, wherein the lift biasing force changing means has a drive means, and the drive means is actuated by an operation command from the outside to change the biasing force of a biasing member steplessly (see, for example, Patent Literature 1).

PATENT LITERATURE

Patent Literature 1: Japanese Patent No. 6307721

However, with the conventional prize acquisition game machine disclosed in Patent Literature 1, the user of the prize acquisition game machine could not use movement information related to past movements of the prize acquisition unit. Consequently, even if the user attempted to move the prize acquisition unit in the same way as in the past in managing the prize acquisition game machine or playing a game, the user's memory would often have already become hazy by that point, which sometimes prevented the prize acquisition unit from being accurately moved to its past position. As a result, the user's goal was not always achieved.

SUMMARY

One or more embodiments of the present invention provide a prize acquisition game machine that can cause a prize acquisition unit to move based on movement information related to past movements of the prize acquisition unit, which enables utilizing a past operation history to assist a player to play a prize acquisition game.

According to one or more embodiments of the present invention, the prize acquisition game machine comprises a prize display unit comprising a housing that accommodates prizes in a game space within the housing, a prize acquisition unit (or prize acquisition device) comprising arms and is configured to move around the game space and grab at least one of the prizes with the arms, a control unit (or controller) that controls the movement of the prize acquisition unit, and a storage unit (or storage) that stores movement information on past movements of the prize acquisition unit in the game space, wherein the control unit is configured to control the movement of the prize acquisition unit based on the movement information stored in the storage unit.

When this configuration is employed, the prize acquisition unit can be moved by making use of movement information related to past movements of the prize acquisition unit. More specifically, when this configuration is employed, the administrator who manages the prize acquisition game machine will be able to reproducibly operate the prize acquisition unit by moving the prize acquisition unit based on past movement information on the prize acquisition unit, which allows the disposition of prizes and other such management to be performed accurately and easily while taking into account the probability of acquiring a prize. Also, it will be possible for a player who uses the prize acquisition game machine to reproducibly operate the prize acquisition unit, which increases interest in the game by encouraging replays when acquiring a prize is almost within reach.

In the prize acquisition game machine according to one or more embodiments of the present invention, the control unit may be configured such that the prize acquisition unit is made to perform planar movement, which includes at least a first movement in a first direction and/or a second movement in a second direction, in a specific plane within the game space, based on a movement request inputted by a user, and after performing the planar movement, the prize acquisition unit is made to perform a third movement in a third direction approaching the prize.

Employing this configuration makes it easy to acquire coordinate information used in reproducing the movement of the prize acquisition unit.

In the prize acquisition game machine according to one or more embodiments of the present invention, the movement information includes, as a specific point on a movement path corresponding to the past movement of the prize acquisition unit, coordinate information of an approach starting point, which is the position of the prize acquisition unit after the planar movement has been performed but before the third movement is performed, and/or coordinate information of a movement direction change point in a plurality of directions when the prize acquisition unit has moved in the directions in the specific plane may be included, and the control unit may move the prize acquisition unit to the direction change point or the approach starting point based on the coordinate information.

When this configuration is employed, the movement of the prize acquisition unit can be reproduced easily and accurately.

In the prize acquisition game machine according to one or more embodiments of the present invention, the movement information may include coordinate information of a specific point on a movement path corresponding to the past movement of the prize acquisition unit, and the control unit may move the prize acquisition unit to the specific point based on the coordinate information.

When this configuration is employed, the past movement of the prize acquisition unit can be reproduced.

In the prize acquisition game machine according to one or more embodiments of the present invention, the control unit may move the prize acquisition unit based on a movement request from the user, after movement to the specific point.

When this configuration is employed, it is possible for the player to play a prize acquisition game from a more appropriate position by reproducing the past movement of the prize acquisition unit and further adjusting the position of the prize acquisition unit.

In the prize acquisition game machine according to one or more embodiments of the present invention, the movement information may include coordinate information on a plurality of points as coordinate information of the specific point, and the control unit may move the prize acquisition unit to one point selected by the user from the points.

When this configuration is employed, movement of the prize acquisition unit can be reproduced according to the user's wishes.

In the prize acquisition game machine according to one or more embodiments of the present invention, the coordinate information may be coordinate information in a coordinate space with a standby position of the prize acquisition unit as origin, the coordinate information may include the respective coordinate information in the coordinate space for the standby position, a movement range over which the prize acquisition unit can move, and a prize insertion position at which the prize acquired by the prize acquisition unit is dropped, and the standby position, the movement range, and the prize insertion position may be specified by manually moving the prize acquisition unit.

When this configuration is employed, it will be easy to obtain the coordinates of the origin and other coordinates based on the coordinates of the origin.

In the prize acquisition game machine according to one or more embodiments of the present invention, the movement information may include movement range information on the prize acquisition unit, and the control unit may control the prize acquisition unit to move within a movement range defined by the movement range information.

When this configuration is employed, movement of the prize acquisition unit within a specific movement range can be realized.

The prize acquisition game machine according to one or more embodiments of the present invention further comprises an operation unit (or operation part) for operating the prize acquisition unit, wherein the movement information may be information corresponding to past movements performed according to either a first method, which is a method in which the administrator of the prize acquisition game machine manually moves the prize acquisition unit, or a second method, which is a method in which the control unit moves the prize acquisition unit based on a movement request inputted by the administrator or the player of the prize acquisition game machine by operating the operation unit.

When this configuration is employed, movement of the prize acquisition unit within a specific movement range can be performed.

The prize acquisition game machine according to one or more embodiments of the present invention further comprises a drive unit (or drive device) that drives the prize acquisition unit, wherein the drive unit comprises at least one of a position sensor and an encoder that sense the position of the prize acquisition unit, and the movement information is acquired based on the at least one of the position sensor and the encoder.

When this configuration is employed, movement range information can be acquired easily and accurately.

In the prize acquisition game machine according to one or more embodiments of the present invention, the control unit may output play information including movement information and a play history of each of a plurality of plays, and the play history includes at least the time when each play was performed and/or whether a prize corresponding to each play was acquired.

When this configuration is employed, it is possible to accurately output play information linked to each player based on a same-player determination.

In the prize acquisition game machine according to one or more embodiments of the present invention, the control unit may further determine whether the players corresponding to the plays are the same person, when determining that the players are the same person, output the play information corresponding to the plays linked to the players.

When this configuration is employed, it is possible to accurately output play information linked to each player based on a same-player determination.

In the prize acquisition game machine according to one or more embodiments of the present invention, the control unit may change an output order of the play information based on the play history.

When this configuration is employed, it is possible to prioritize the display of play information that is more likely to be checked or used by administrators and players.

The prize acquisition game machine according to one or more embodiments of the present invention further comprises a display unit (or display), wherein the control unit may plot, on the display, a symbol corresponding to the movement information at a position corresponding to the movement information on an image representing the game space.

When this configuration is employed, it is possible to easily confirm play information linked to each player.

With one or more embodiments of the present invention, it is possible to provide a prize acquisition game machine with which a prize acquisition unit can be moved by making use of movement information related to past movements of the prize acquisition unit.

DETAILED DESCRIPTION

Figure 1:
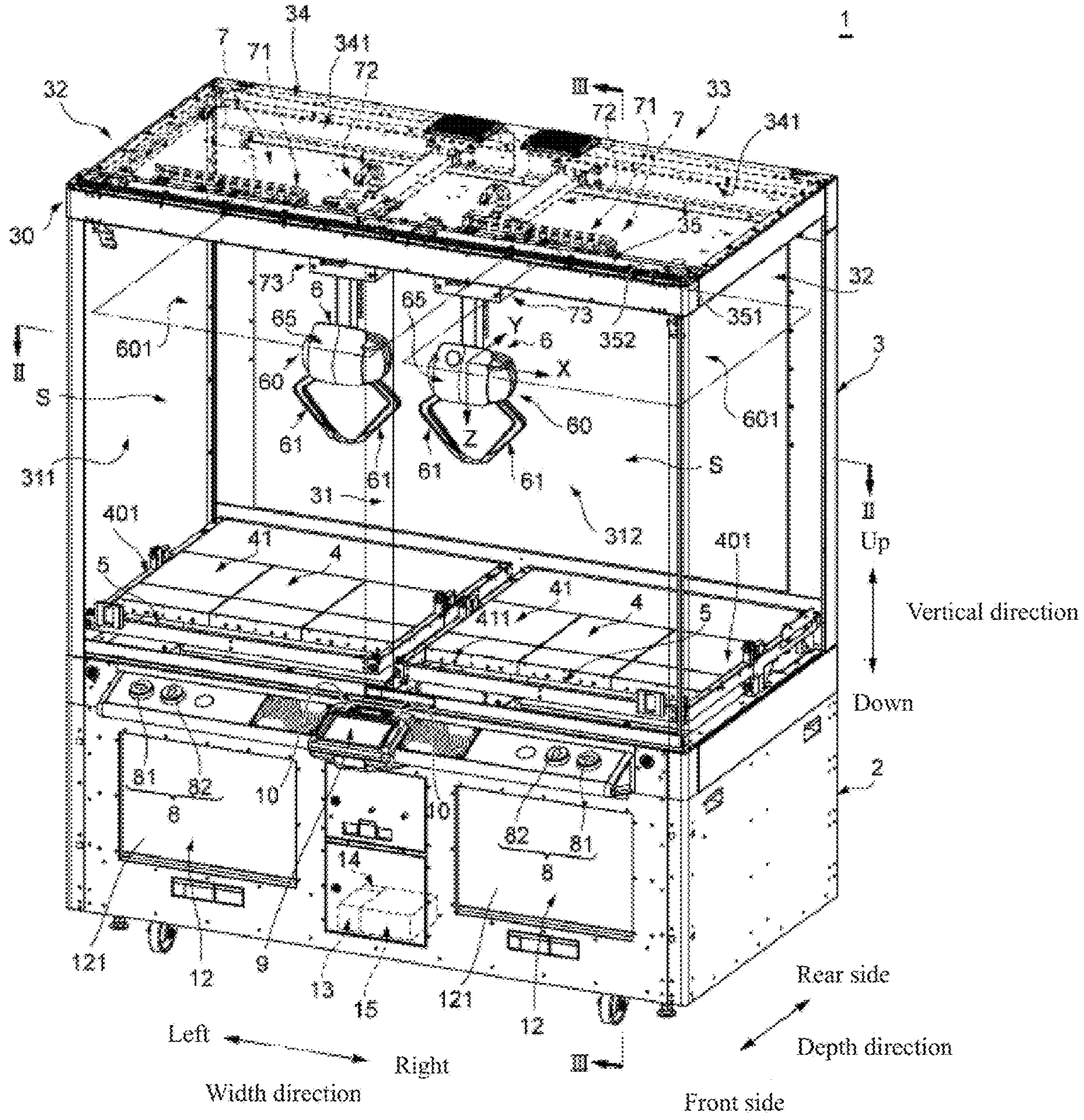
FIG. 1 is an oblique view showing the configuration of a prize acquisition game machine according to one or more embodiments.

Embodiments will now be described with reference to the drawings. The positional relationships, such as the up, down, left, and right in the drawings, are based on the positional relationships shown in the drawings, unless otherwise specified. Also, the dimensional ratios in the drawings are not limited to those that are depicted. Furthermore, the following embodiments are given for the sake of describing the present invention, and are not intended to limit the present invention to the embodiments. Moreover, the present invention can be modified in various ways without departing from the gist thereof.

Overview of Prize Acquisition Game Machine 1

First, an overview of the prize acquisition game machine 1 according to one or more embodiments will be described with reference to FIG. 1. FIG. 1 is an oblique view of the prize acquisition game machine 1.

The prize acquisition game machine 1 according to one or more embodiments is an example of a machine for performing a prize acquisition game or prize grabbing game, in which a prize is grabbed and acquired. As shown in FIG. 1, the prize acquisition game machine 1 comprises: a main body 2 that is provided at the bottom part of the prize acquisition game machine 1; a prize display unit 3 that is provided above the main body 2 and defines a game space S; a prize support unit 4 that supports prizes in the game space S; a prize drop opening 5 that is provided so as to couple the main body 2 and the prize display unit 3 and that allows the prizes to fall; a prize acquisition unit (or prize acquisition device) 6 that is provided movably in the game space S and is used to acquire prizes; and a drive unit (or drive device) 7 that is provided above the game space S and drives the prize acquisition unit 6.

Here, the game space S is a space in which prizes are displayed and the prize acquisition unit 6 performs the operation of acquiring prizes. A prize may be anything that can be grabbed by the prize acquisition unit 6, and is a toy such as a stuffed animal or a doll, for example. Also, prizes are displayed on the prize display unit 3 upon being placed on the prize support unit 4.

Also, as shown in FIG. 1, the prize acquisition game machine 1 is a two-player game device in which two players can simultaneously play a prize acquisition game. Accordingly, the above configuration of the prize acquisition game machine 1 (except for the display unit 9 of the main body 2 (discussed below)) is provided in two sets, on the left and right sides in the width direction of the prize acquisition game machine 1. The following description will focus on the set on the right side.

Details of Prize Acquisition Game Machine 1

Figure 2:
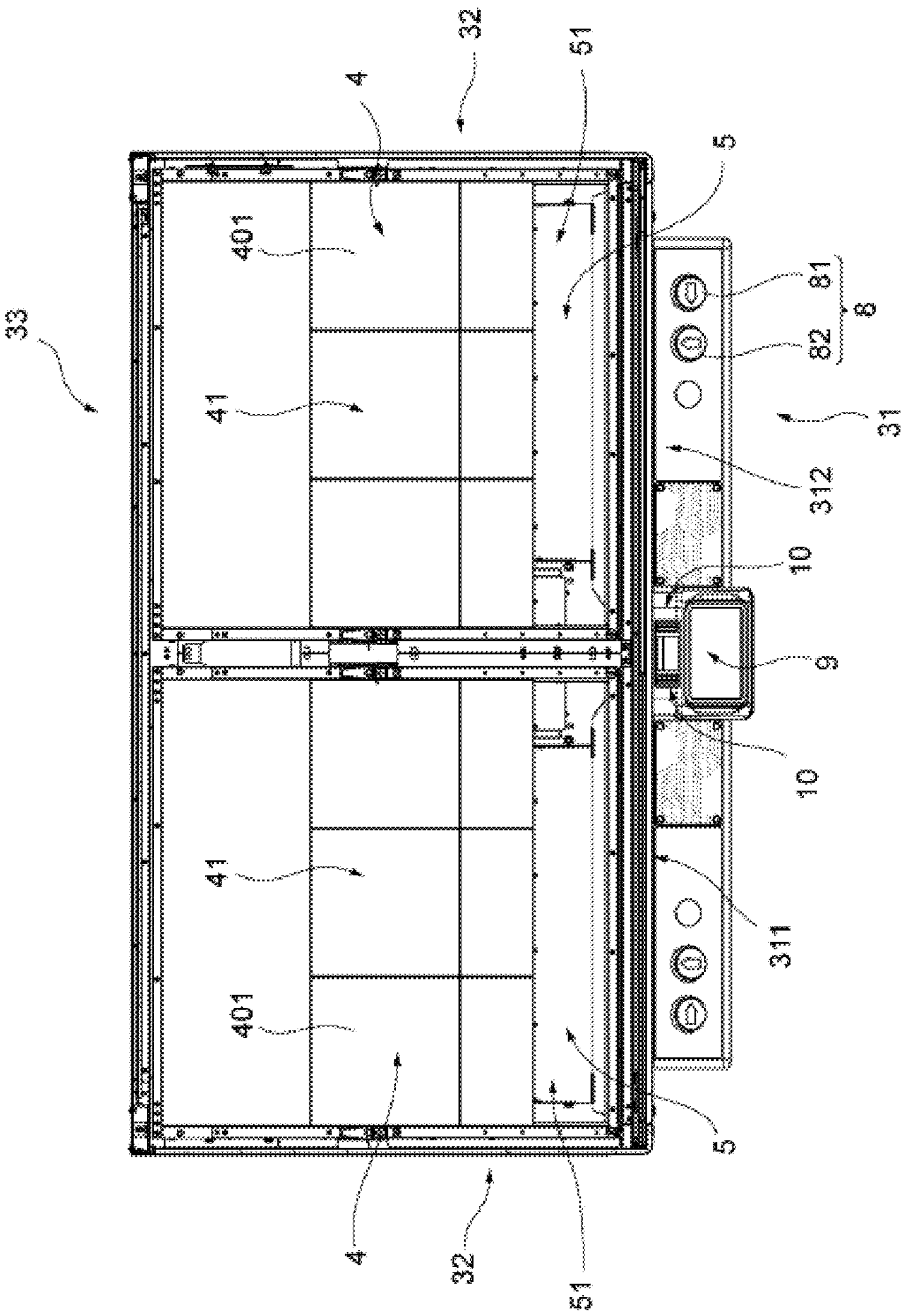
FIG. 2 is a cross sectional view along the II-II line in FIG. 1.
Figure 3:
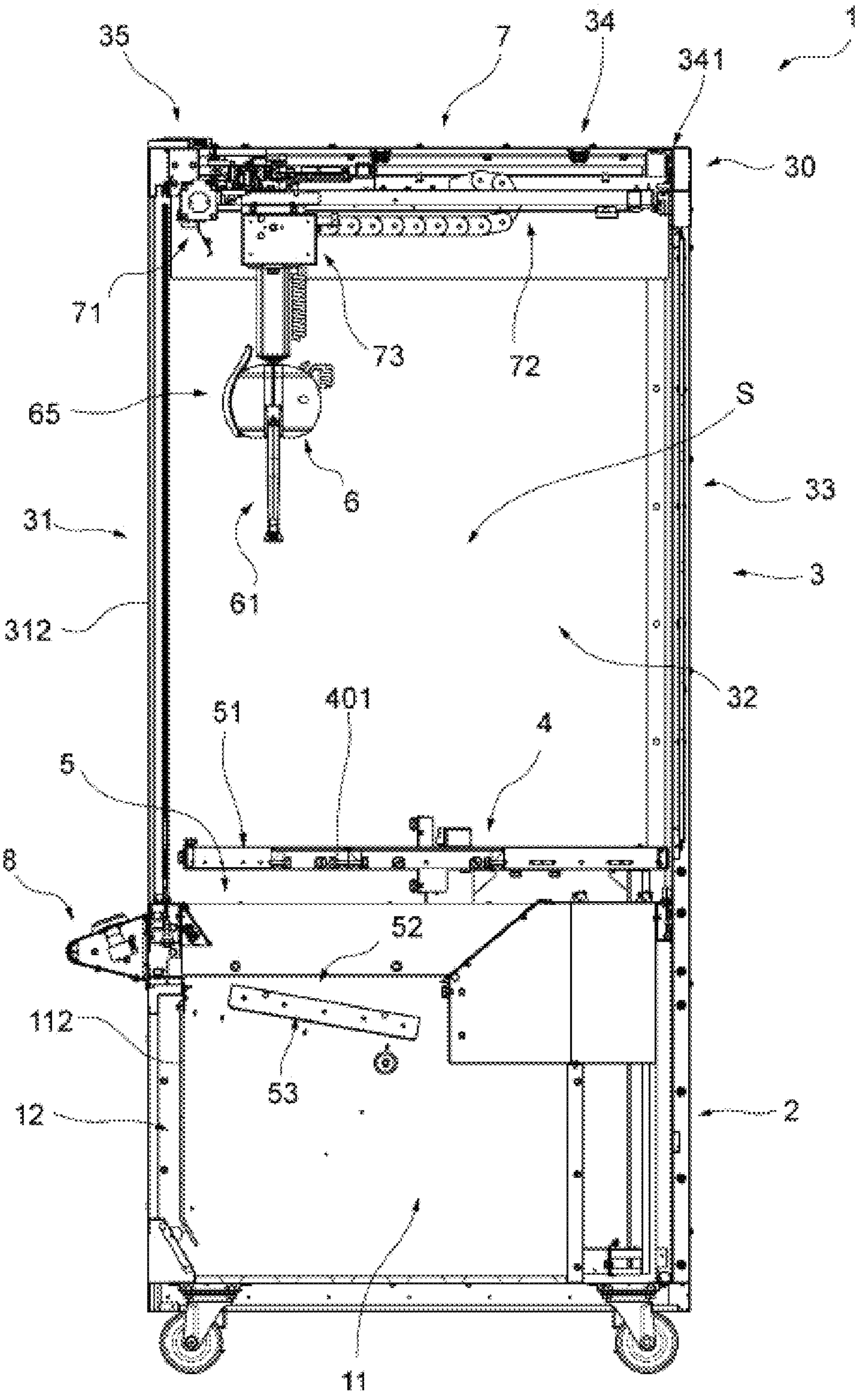
FIG. 3 is a cross sectional view along the III-III line in FIG. 1.
Figure 4:
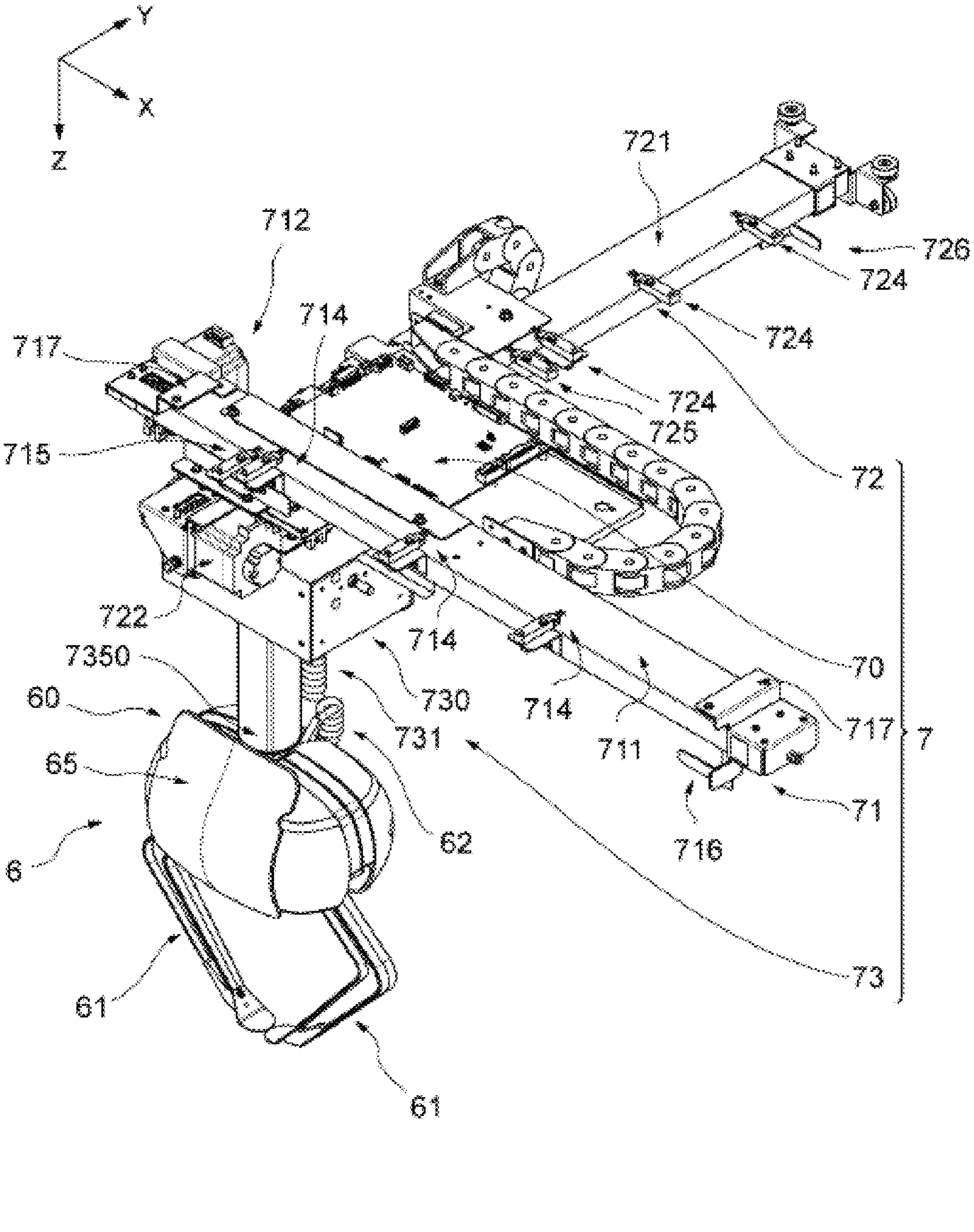
FIG. 4 is an oblique view illustrating a prize acquisition unit and a drive unit as seen from above the prize acquisition game machine according to one or more embodiments.
Figure 5:
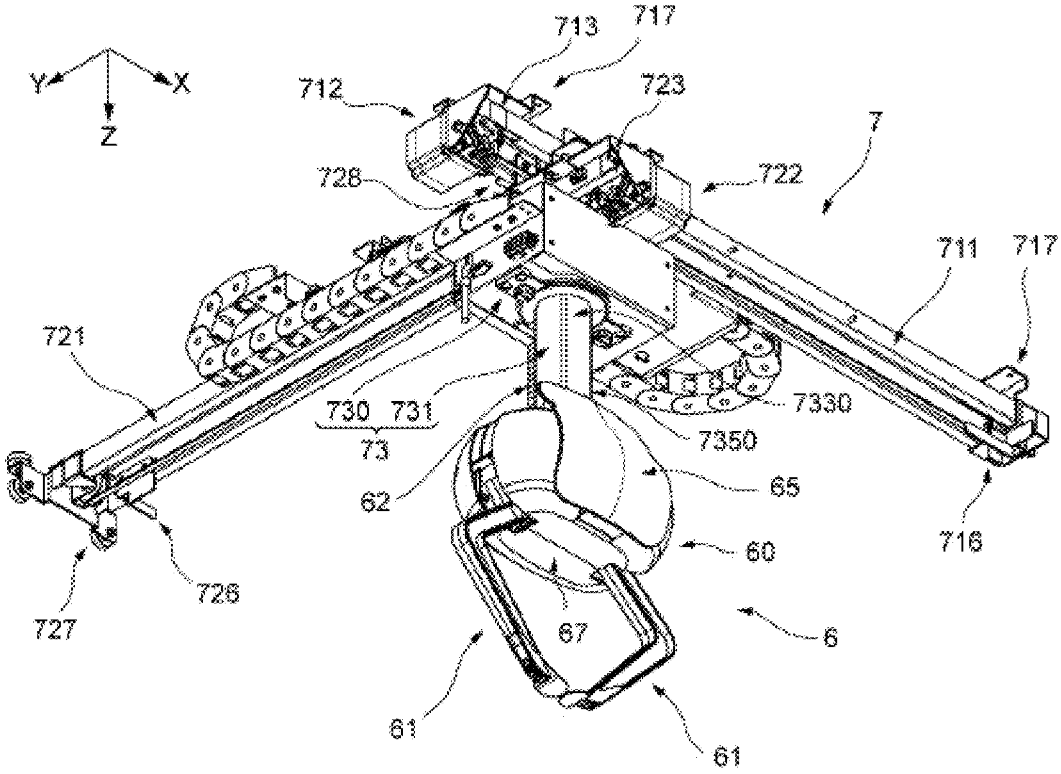
FIG. 5 is an oblique view illustrating the prize acquisition unit and the drive unit as seen from below the prize acquisition game machine according to one or more embodiments.
Figure 6:
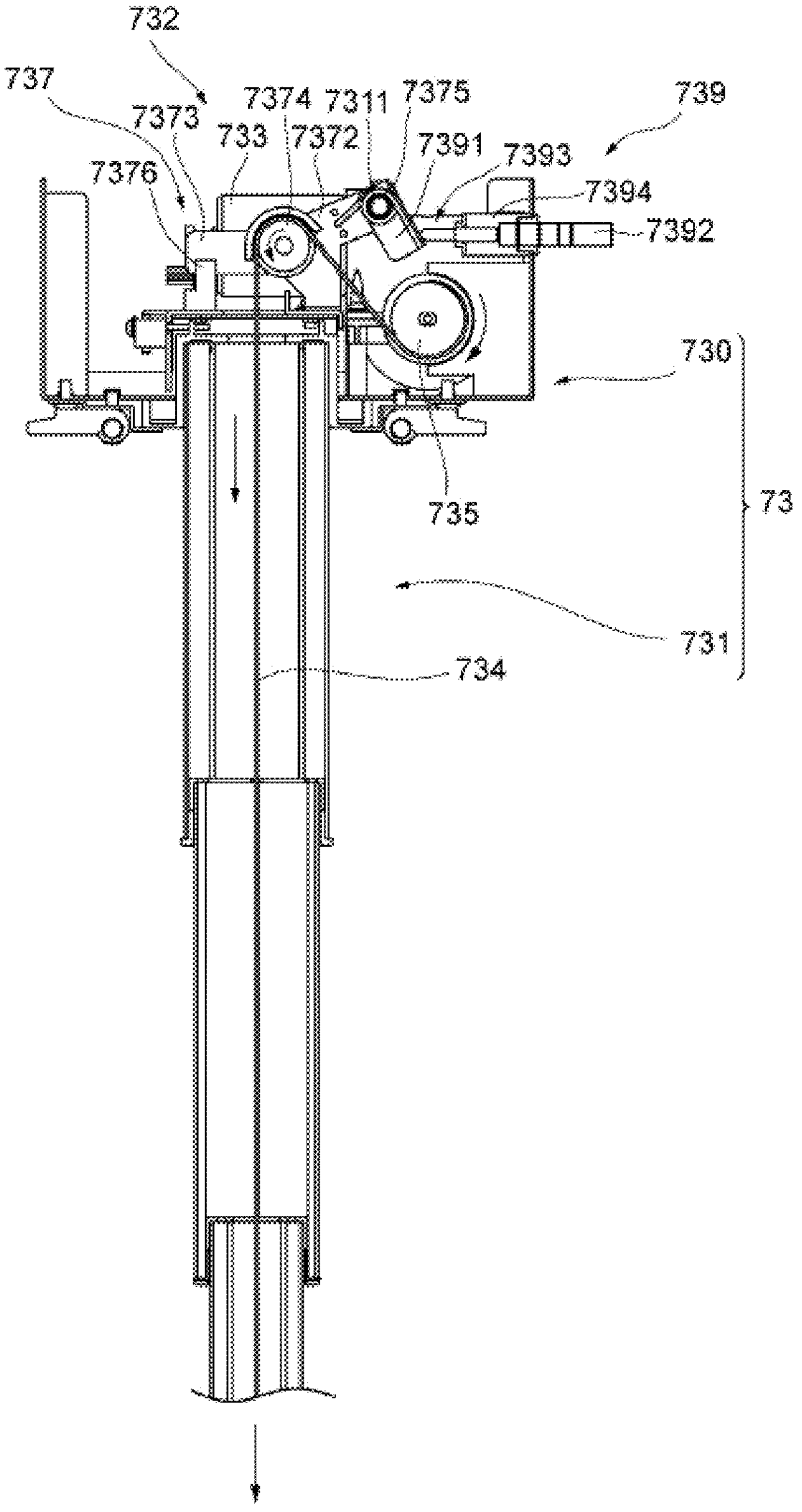
FIG. 6 is a diagram showing the state of a third drive unit when the prize acquisition unit of the prize acquisition game machine according to one or more embodiments is approaching a prize.
Figure 7:
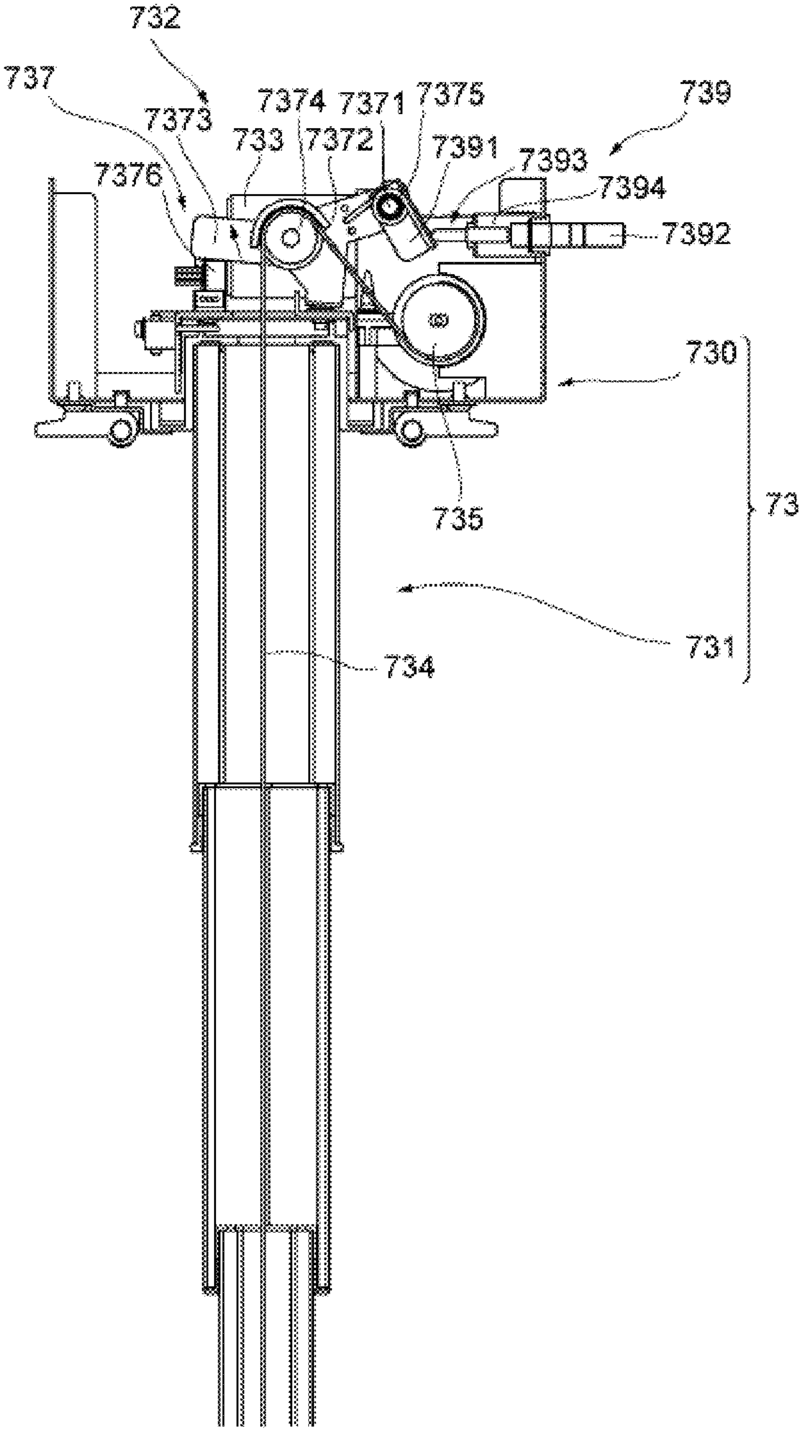
FIG. 7 is a diagram showing the state of the third drive unit when the prize acquisition unit of the prize acquisition game machine according to one or more embodiments has come into contact with a prize.

Next, the components of the prize acquisition game machine 1, that is, the main body 2, the prize display unit 3, the prize support unit 4, the prize drop opening 5, the prize acquisition unit 6, and the drive unit 7, will be described in order, with reference to FIGS. 1 to 7. FIG. 2 is a cross sectional view along the II-II line in FIG. 1. FIG. 3 is a cross sectional view along the III-III line in FIG. 1. FIGS. 4 and 5 are oblique views of the prize acquisition unit 6 and the drive unit 7 as seen from above and below the prize acquisition game machine 1. FIGS. 6 and 7 are diagrams of the configuration of a third drive unit (or third driver) 73 (discussed below) of the drive unit 7.

The width direction, depth direction, and vertical direction of the prize acquisition game machine 1 and the game space S will sometimes be referred to as the "X direction," the "Y direction," and the "Z direction," respectively. Also, unless specified otherwise, the "user" in the following description includes both the administrator who manages the prize acquisition game machine 1 and the players who use the prize acquisition game machine 1 to play a prize acquisition game.

Main Body 2

First, the main body 2 will be described in detail with reference to FIGS. 1 to 3.

As shown in FIG. 1, the main body 2 has an operation unit (or operation part) 8 that is provided on the front side for the user to operate, a speaker (not shown) that is provided below the operation unit 8, a display unit (or display) 9 for displaying play information related to the game, initializing game conditions, and so forth, a coin slot 10 for accepting game fees, a prize accommodating unit 11 that communicates with a prize drop opening 5, and a prize payout opening 12, which is an opening that faces the outside of the prize accommodating unit 11. Also, the main body 2 has a storage unit (or storage) 13 that stores data and instructions or programs used in a prize acquisition game, a timer 14 that acquires the current time, and a control unit 15 (or controller) for controlling various operations of the prize acquisition game machine 1, which are functional components housed inside the main body 2.

The operation unit 8 is configured for operating the prize acquisition unit 6. More specifically, the operation unit 8 is configured to receive a movement request corresponding to an operation of the prize acquisition unit 6 according to a user operation. Here, the movement request is a request made by the user to move the prize acquisition unit 6 in the X direction and/or the Y direction in a specific plane 601 within the game space S. The X direction is an example of a first direction, and the Y direction is an example of a second direction. Also, the operation unit 8 has a first button 81 for accepting a request to move the prize acquisition unit 6 in the X direction, and a second button 82 for accepting a request to move the prize acquisition unit 6 in the Y direction. The operation unit 8 may be configured as something other than a button. For example, the operation unit 8 may be a joystick, a lever, or the like.

The speaker is configured to output game sounds such as background music, alarm sounds, and so on. In a normal state, the speaker outputs game sounds such as background music. Meanwhile, the speaker can output an alarm sound in the event that the prize acquisition game machine 1 is subjected to a certain impact.

The display unit 9 is a panel for displaying play information related to the prize acquisition game, making initial settings for the game, displaying initial setting information that has been set, and so on. Here, the play information includes movement information on the prize acquisition unit 6 and the play history of each play. The initial setting information includes setting information for the prize acquisition unit related to the distance the prize acquisition unit 6 drops in the Z direction, its movement speed, stopping accuracy, arm gripping strength, etc., audio setting information related to the type of audio going to the speaker, its volume, etc., and lighting setting information for the prize display unit 3.

The prize accommodating unit 11 is configured to temporarily accommodate a dropped prize before the user removes from the prize acquisition game machine 1 a prize that has dropped out of the prize drop opening 5. The prize accommodating unit 11 is provided below the prize drop opening 5.

The prize payout opening 12 is provided on the front side of the main body 2 so as to communicate with the prize accommodating unit 11. A door 121 that can be opened and closed is attached to the prize payout opening 12. When the door 121 closes, the prize payout opening 12 is closed to prevent prizes from coming out, and to prevent entry of foreign objects, etc. (including for the theft of prizes) into the prize acquisition game machine 1 through the prize payout opening 12. On the other hand, when the door 121 opens, the prize payout opening 12 is opened, and the prizes stored in the prize accommodating unit 11 can be taken out.

The control unit 15 is configured to control the overall operation of the prize acquisition game machine 1. Upon receiving the movement request accepted by the operation unit 8 and the display unit 9 and the time information acquired by the timer 14, the control unit 15 executes a prize acquisition game by controlling the movement of the prize acquisition unit 6 in the game space S, the output of the speaker, the lighting of the prize display unit 3, and so forth based on the data and instructions or program stored in the storage unit 13. The control unit 15 will be described in further detail below.

Prize Display Unit 3

Next, details of the prize display unit 3 will be described with reference to FIGS. 1 to 3.

As shown in FIG. 2, the prize display unit 3 comprises a housing 30; a front plate 31, side plates 32, and a back plate 33 provided to the front, left and right sides, and back of the housing 30, respectively; a support 34 that is formed above the housing 30 and supports the drive unit 7, and an illumination unit (or illuminator) 35 that is provided on the front side above the support 34.

The front plate 31, the side plates 32, and the back plate 33 are configured to define the game space S. Also, the front plate 31, the side plates 32, and the back plate 33 are formed from a material through which light can pass, such as transparent acrylic resin or glass. This configuration affords a game space S that can be viewed from the front, both sides, and the back of the prize acquisition game machine 1. The back plate 33 may be formed by a plate member of metal or the like.

As shown in FIGS. 1 and 2, the front plate 31 has a first front plate 311 and a second front plate 312. The first front plate 311 is provided closer to the back side than the second front plate 312. The first front plate 311 and the second front plate 312 are provided so as to be slidable in the width direction. In other words, the first front plate 311 and the second front plate 312 are sliding doors that open and close in the width direction. With this configuration, the administrator of the prize acquisition game machine 1 can open the game space S by opening the first front plate 311 and the second front plate 312 in order to operate or perform maintenance on the prize acquisition unit 6, add more prizes, or perform other such jobs. Except when the administrator is performing work, the first front plate 311 and the second front plate 312 are closed, leaving the game space S in a closed state (hereinafter referred to as a "normal state").

The support 34 is configured to movably support the drive unit 7 and to hold a portion of the drive unit 7 (a first drive unit 71 (or first driver) and a second drive unit (or second driver) 72; described below). The support 34 has a rail 341 that is provided on its inner peripheral surface and that movably supports the drive unit 7. The attachment of the support 34 and the drive unit 7 will be explained in detail in conjunction with a description of the drive unit 7.

The illumination unit 35 is configured to emit light to the outside of the prize display unit 3. The illumination unit 35 has a light guide member 351 and a plurality of light-emitting diodes 352 serving as light-emitting elements. The light guide member 351 is a transparent flat plate made of acrylic resin, and has a front emission surface and side emission surfaces. The light-emitting diodes 352 are provided on the back side of the light guide member 351.

Also, the light emitted by the light-emitting diodes 352 enters the end on the back side of the light guide member 351, is reflected inside the light guide member 351 and guided to the front side, and exits from the front emission surface and the side emission surfaces. The illumination unit 35 is lit in the normal state. This improves the aesthetic appearance of the prize acquisition game machine 1. On the other hand, in the event that the prize acquisition game machine 1 is subjected to a certain impact, the illumination unit 35 flashes. Therefore, the illumination unit 35 can issue an alarm signal to the surroundings.

Prize Support Unit 4

Next, the prize support unit 4 will be described in detail with reference to FIGS. 1 to 3.

The prize support unit 4 has a flat structure formed between the main body 2 and the prize display unit 3 in the vertical direction. The prize support unit 4 defines the game space S along with the front plate 31, the side plates 32, the back plate 33, and the support 34. The prize support unit 4 has a prize support surface 401 on the upper side in the thickness direction, on which a prize is placed.

Also, the prize support unit 4 has a plurality of support plates 41. The support plates 41 are, for example, plate members made of a synthetic resin. An attachment part 411 for coupling to another support plate 41 is provided on the side surface of each support plate 41. With this attachment part 411, the support plates 41 can be freely combined to constitute prize support units 4 of different shapes. Consequently, the shape and size of the prize support surface 401 of the prize support unit 4 can be easily changed in response to changes in the type of prize or the game rules.

Prize Drop Opening 5

The prize drop opening 5 will now be described with reference to FIGS. 2 and 3.

The prize drop opening 5 is configured to allow the game space S and the prize accommodating unit 11 to communicate. As shown in FIGS. 2 and 3, the prize drop opening 5 has a first drop opening 51 formed on the front side of the prize support unit 4, and a second drop opening 52 that is formed on the lower side of the first drop opening 51 and the prize support unit 4 and allows the first drop opening 51 and the prize accommodating unit 11 to communicate.

The size of the first drop opening 51 can be changed by changing the way the support plates 41 of the prize support unit 4 are combined. As shown in FIG. 3, the second drop opening 52 is provided with a drop detector 53 that detect s the dropping of a prize. This drop detector 53 affords accurate detection of whether the user has acquired a prize.

Prize Acquisition Unit 6

The prize acquisition unit 6 will now be described in detail with reference to FIGS. 1, 4, and 5.

The prize acquisition unit 6 is configured to move within the game space S and grab a prize that has been placed on the prize support unit 4. The prize acquisition unit 6 is provided within the game space S so as to be suspended from the drive unit 7. The prize acquisition unit 6 also has a main body 60 that is connected to the drive unit 7, and a pair of arms 61 extending downward from the main body 60. Here, in the example shown in FIGS. 1, 4, and 5, there are two arms 61, but the number is not limited to this. The number of arms 61 may be three or more, for example.

The main body 60 has, provided in the interior thereof (not shown), an attachment part that is used to attach the prize acquisition unit 6 to the drive unit 7, and an arm drive unit (or arm driver) that drives the opening and closing of the pair of arms 61. The arm drive unit is powered by a cable 62. Also, as shown in FIG. 1, the main body 60 has a display part 65 formed on the front side surface thereof for displaying design sheets and the like. Displaying a design sheet improves the aesthetic appearance of the main body 60.

The pair of arms 61 are configured to grab a prize. The pair of arms 61 can perform opening and closing operations toward or away from each other by driving the arm drive unit so as to grab or release a prize. Also, the degree of opening of the pair of arms 61 is information included in the initial setting information, and can be adjusted by the administrator of the prize acquisition game machine 1.

Also, the prize acquisition unit 6 can move in the X direction, the Y direction, and the Z direction within the game space S. Here, the Z direction includes the direction facing downward (hereinafter referred to as the "Z direction descent direction") and the direction facing upward (hereinafter referred to as the "Z direction ascent direction"). In the following, movement along the Z direction descent direction will be referred to as "approach movement," movement along the Z direction ascent direction will be referred to as "ascent movement," and if no distinction is made between the two, they may be collectively referred to as "Z direction movement." The X direction movement, Y direction movement, and approach movement of the prize acquisition unit 6 are examples of the first movement, the second movement, and the third movement, respectively.

The prize acquisition unit 6 is configured to move in the Z direction (perform approach movement) after moving in the X direction and/or the Y direction, for example. Also, the movement of the prize acquisition unit 6 in the X direction and the Y direction is performed based on the user's intention, whereas the movement of the prize acquisition unit 6 in the Z direction is performed based on the initial setting regardless of the user's intention. If the operation unit 8 includes a third button related to movement in the Z direction, the movement of the prize acquisition unit 6 in the Z direction can be performed based on the user's intention, that is, the user's operation of the third button.

In the following description, when no distinction is made between the X direction movement and Y direction movement of the prize acquisition unit 6, they may be collectively referred to as "planar movement." Also, the position where the prize acquisition unit 6 is stopped before the game starts may be called the "standby position," the position of the prize acquisition unit 6 after the planar movement of the prize acquisition unit 6 has been performed but before the Z direction movement is performed may be called the "approach starting point," and when the prize acquisition unit has moved in the X direction and the Y direction during planar movement, the position of the prize acquisition unit 6 at the change point between the X direction movement and the Y direction movement may be called the "direction change point."

The movement of the prize acquisition unit 6 will now be described in greater detail. The movement of the prize acquisition unit 6 in the X direction and the Y direction is carried out by a first method in which the administrator of the prize acquisition game machine 1 manually moves the prize acquisition unit 6, or by a second method in which the control unit 15 moves the prize acquisition unit 6 based on a movement request inputted by the administrator or the player of the prize acquisition game machine 1 by pressing a first button 81 and a second button 82 of the operation unit 8.

The first method is a method used to determine the standby position, movement range, and prize insertion position of the prize acquisition unit 6. Here, the standby position of the prize acquisition unit 6 is the origin of the coordinate space (XYZ space) in which the prize acquisition unit 6 can move. The movement range is the range over which the prize acquisition unit 6 can move in the XY plane of the coordinate space. The prize insertion position is a position above the first drop opening 51, used for dropping the prize acquired by the prize acquisition unit 6 into the first drop opening 51. Also, after the prize acquisition unit 6 has been moved to the standby position by the first method, the coordinates of the point corresponding to the position of the prize acquisition unit 6 are automatically acquired by a position sensor of the drive unit 7 (X direction origin sensor 715 and X direction position sensor 714, and/or Y direction origin sensor 725 and Y direction position sensor 724; discussed below) and encoders (first encoder 713 and second encoder 723, discussed below). The same holds true for the acquisition of the coordinates of the points corresponding to the movement range and the prize insertion position. With this first method, the administrator can easily acquire, change, etc., the standby position, movement range, and prize insertion position.

The second method is a method used in the acquisition of a prize by the prize acquisition unit 6. When the second method is used, the drive unit 7 drives the movement of the prize acquisition unit 6 in the X direction and/or the Y direction under the control of the control unit 15. Also, just as in the first method, after the prize acquisition unit 6 has been moved by the second method, the coordinates of the point corresponding to the position of the prize acquisition unit 6 are automatically acquired by the position sensors and encoders of the drive unit 7. With this second method, the administrator and the player can freely move the prize acquisition unit 6 and can acquire the coordinates of a point on the movement path of the prize acquisition unit.

Also, when either the first method or the second method is used, the prize acquisition unit 6 is moved along the rails of the drive unit 7 (first rail 711 and/or second rail 721 (discussed below)). The rails of the drive unit 7 are provided so that their lengthwise direction is parallel to the prize support surface 401. Consequently, the prize acquisition unit 6 can move in a specific plane 601 whose center of gravity is parallel to the prize support surface 401.

The movement of the prize acquisition unit 6 in the Z direction is movement that is automatically performed after movement in a specific plane in order to approach and grab a prize. Also, the movement of the prize acquisition unit 6 in the Z direction is movement driven by the drive unit 7 under the control of the control unit 15. More specifically, after the planar movement of the prize acquisition unit 6 in a specific plane 601 is performed, that is, after the prize acquisition unit 6 has stopped at the approach starting point, the drive unit 7 drives the prize acquisition unit 6 to perform approach movement in the Z direction descent direction based on the initial setting, under the control of the control unit 15. Also, when the bottom part 67 of the main body 60 of the prize acquisition unit 6 applies a certain pressing force to the prize, the approach movement of the prize acquisition unit 6 comes to a stop. After this, the drive unit 7 drives the prize acquisition unit 6 to perform ascent movement in the Z direction ascent direction based on the initial setting, under the control of the control unit 15. The movement of the prize acquisition unit 6 in the Z direction will be described in detail in the description of the drive unit 7.

Also, when the user has selected a specific point (such as an approach starting point or a direction change point) from among the points on the movement path corresponding to past movements of the prize acquisition unit 6 displayed on the display unit 9, the prize acquisition unit 6 can be driven in the X direction and/or the Y direction, and in the Z direction, so as to arrive at that specific point under the control of the control unit 15. In other words, the prize acquisition unit 6 can perform a reproduction of past movements.

The opening and closing of the pair of arms 61 vary with changes to the position of the prize acquisition unit 6 under the control of the control unit 15. More specifically, the pair of arms 61 are closed when the prize acquisition unit 6 is in the standby position, reopen at a preset degree of opening after the prize acquisition unit 6 moves to the approach starting point via planar movement, close so as to grab the prize after the prize acquisition unit 6 performs approach movement and stops, open so as to release the grabbed prize after the prize acquisition unit 6 moves to the prize insertion position via ascent movement, and then reclose. After this, the prize acquisition unit 6 returns to the standby position while the pair of arms 61 are still closed.

Drive Unit 7

Next, the drive unit 7 will be described in detail with reference to FIGS. 1 and 4 to 7.

The drive unit 7 is configured to support the prize acquisition unit 6 so as to be suspended from the drive unit 7, and to drive the prize acquisition unit 6 in a specific plane 601 of the game space S based on control by the control unit 15. The drive unit 7 has a first drive unit 71 that drives movement of the prize acquisition unit 6 in the X direction, a second drive unit 72 that drives movement of the prize acquisition unit 6 in the Y direction, and a third drive unit 73 that drives movement of the prize acquisition unit 6 in the Z direction. Also, the drive unit 7 is configured to communicate with the control unit 15, and has a control board 70 that, along with the control unit 15, controls the electrical configuration of each of the first drive unit 71, the second drive unit 72, and the third drive unit 73.

The first drive unit 71 has a first rail 711, a first motor 712 and a first encoder 713 provided on one end side of the first rail 711, an X direction origin sensor 715 and three X direction position sensors 714 provided along the lengthwise direction of the first rail 711, dogs 716 provided at both ends of the first rail 711, and an attachment component 717 that is provided at both ends of the first rail 711 and is used for attaching the first rail 711 to the support 34.

The first rail 711 is provided so as to be movable with respect to the support 34 in the width direction, by attachment of the roller of the first drive unit 71 and the rail 341 of the support 34. Since the first rail 711 is provided so that its lengthwise direction is parallel to the prize support surface 401, the lengthwise direction of the first rail 711 corresponds to the X direction of movement of the prize acquisition unit 6.

The first motor 712 is configured to move the second drive unit 72 and the third drive unit 73 along the first rail 711 (that is, in the X direction), and thereby realize movement of the prize acquisition unit 6 attached to the third drive unit 73 in the X direction. The first encoder 713 is configured to sense the distance traveled by the prize acquisition unit 6 in the X direction by sensing the rotational state of the first motor 712 (such as the rotational movement amount and angle of the first motor 712). This first encoder 713 allows the distance traveled by the prize acquisition unit 6 in the X direction to be accurately sensed with a simple configuration.

The X direction origin sensor 715 and the three X direction position sensors 714 are examples of position sensors that sense the position of the prize acquisition unit 6, that is, the coordinates of a specific point on the movement path of the prize acquisition unit 6. The X direction origin sensor 715 is a sensor that senses the standby position of the prize acquisition unit 6 as the origin, together with the Y direction origin sensor 725 (discussed below). Acquiring the origin coordinates makes it possible to determine the coordinate space (XYZ space) in which the prize acquisition unit 6 is located. Here, the standby position of the prize acquisition unit 6 is above the front end of the game space S. Also, the standby position of the prize acquisition unit 6 is a position specified by the administrator of the prize acquisition game machine 1 by manually moving the prize acquisition unit 6.

The three X direction position sensors 714 are sensors that sense the X coordinate of points on the movement path of the prize acquisition unit 6. The two dogs 716 are detection pieces provided at both ends of the movement range of the prize acquisition unit 6 in the X direction. These two dogs 716 allow the prize acquisition unit 6 to move within the movement range in the X direction.

The second drive unit 72 has a second rail 721, a second motor 722 provided at one end of the second rail 721, a second encoder 723 that senses the rotational state of the second motor 722, a Y direction origin sensor 725 and three Y direction position sensors 724 provided along the lengthwise direction of the second rail 721, and dogs 726 provided at both ends of the second rail 721. The second drive unit 72 also has rollers 727 provided at both ends of the second rail 721 for movably attaching to the rail 341 of the support 34, and an attachment part 728 for movably attaching to the first rail 711.

The second rail 721 is provided so as to be movable with respect to the support 34 and the drive unit 71 in the depth direction by means of attachment of the rollers 727 and the rail 341 of the support 34, and the attachment of the attachment part 728 and the first rail 711. Since the second rail 721 is provided so that its lengthwise direction is parallel to the prize support surface 401, the lengthwise direction of the second rail 721 corresponds to the Y direction of movement of the prize acquisition unit 6.

The second motor 722 is configured to move the third drive unit 73 and the first drive unit 71 along the second rail 721 (that is, in the Y direction), thereby realizing movement in the Y direction of the prize acquisition unit 6 attached to the third drive unit 73. The second encoder 723 is configured to sense the distance traveled by the prize acquisition unit 6 in the Y direction by sensing the rotational state of the second motor 722 (such as the rotational movement amount and angle of the second motor 722). With this second encoder 723, the distance traveled by the prize acquisition unit 6 in the Y direction can be accurately sensed with a simple configuration.

The Y direction origin sensor 725 and the three Y direction position sensors 724 are examples of position sensors that sense the position of the prize acquisition unit 6, that is, the coordinates of a specific point on the movement path of the prize acquisition unit 6. The Y direction origin sensor 725 is a sensor that, along with the X direction origin sensor 715, senses the standby position of the prize acquisition unit 6 as the origin. The three Y direction position sensors 724 are sensors that sense the Y coordinate of points on the movement path of the prize acquisition unit 6. The two dogs 726 are detection pieces provided at both ends of the movement range of the prize acquisition unit 6 in the Y direction. These two dogs 726 allow the prize acquisition unit 6 to move within the movement range in the Y direction.

The third drive unit 73 has a main body 730 and a support 731 for supporting the prize acquisition unit 6 and moving it up and down. The support 731 is an expandable tube formed by fitting a plurality of pipes together in a telescopic fashion. The support 731 has an upper end 7330 coupled to the main body 730, and a lower end 7350 coupled to the prize acquisition unit 6.

The main body 730 has a winding and unwinding unit 732 that is provided inside the housing of the main body 730 and is attached to the prize acquisition unit 6, and a wire 734 that is wound up by the winding and unwinding unit 732.

The winding and unwinding unit 732 has a third motor 733, a reduction gear part (not shown), a wire winding pulley 735, a Z direction movement stop part 737, and a biasing force adjustment part 739. The third motor 733 plays out or winds up the wire 734 by rotating the wire winding pulley 735 forward or backward via deceleration of the reduction gear part. By playing out or winding up the wire 734, the prize acquisition unit 6 fixed to the wire 734 can perform ascent movement or approach movement in the Z direction. In this case, the length of the support 731 in the Z direction expands and contracts as the length of the wire 734 changes due to play-out or wind-up.

The Z direction movement stop part 737 is configured to stop the Z direction movement of the main body 60, that is, the approach movement or ascent movement, when the bottom part 67 of the main body 60 makes contact with a prize and pushes on the prize with a specific pressure due to the approach movement of the main body 60. The Z direction movement stop part 737 has a dog rotation shaft 7371, a swing arm 7372 that can swing around the dog rotation shaft 7371, a Z direction dog 7373 that is provided at one end of the swing arm 7372 and swings along with the swing arm 7372, a tension pulley 7374 that is rotatably supported by the swing arm 7372, a coil spring 7375 that biases the swing arm 7372 in the lifting direction of the prize acquisition unit 6 so as to press the tension pulley 7374 against the wire 734, an approach stop sensor 7376 for stopping approach movement (descent movement) in the Z direction, and an ascent stop sensor for stopping ascent movement in the Z direction.

One end of the wire 734 is wound up by a wire wind-up pulley 735 of the winding and unwinding unit 732, and the other end is played out from the tension pulley 7374 of the Z direction movement stop part 737 so as to pass through the inside of the support 731. Also, a cylindrical connecting part (not shown) that is able to move up and down in a pipe located on the lowest side of the support 731 in the Z direction is provided at the other end of the wire 734. The wire 734 is fixed to the attachment part (not shown) of the prize acquisition unit 6 via its connecting part. The prize acquisition unit 6 is thus provided so as to be suspended from the wire 734.

The biasing force adjustment part 739 is configured to change the biasing force exerted by the coil spring 7375 in the lifting direction. The biasing force adjustment part 739 has a movable restraining member 7391, an adjustment knob 7392, and a knob support member 7394 that supports the adjustment knob 7392.

The movable restraining member 7391 is a flat member that is rotatably attached to the dog rotating shaft 7371, and is disposed so that the end of the coil spring 7375 comes into contact with it. Here, one end of the coil spring 7375 is hooked on and fixed to the swing arm 7372, and the other end is hooked on the movable restraining member 7391. Accordingly, when the movable restraining member 7391 is rotated around the dog rotating shaft 7371, this changes the biasing force of the coil spring 7375 according to the amount of rotation, that is, the tension of the biasing force when the swing arm 7372 is biased in the lifting direction of the prize acquisition unit 6 by pressing the tension pulley 7374 against the wire 734.

The adjustment knob 7392 is used to change the angle of the movable restraining member 7391, and has a threaded portion that displaces the position of the distal end portion 7393 according to the amount of rotation. The distal end portion 7393 is provided so as to come into contact with the outer surface of the movable restraining member 7391 and press against the repulsive force of the coil spring 7375.

When the adjustment knob 7392 is rotated forward to advance the distal end portion 7393, the movable restraining member 7391 is pushed in, and the biasing force of the coil spring 7375 increases. Consequently, there is an increase in the biasing force of the coil spring 7375 that biases the swing arm 7372 in the lifting direction of the prize acquisition unit 6, and as a result, there is also an increase in the biasing force in the lifting direction that is exerted on the prize acquisition unit 6 itself via the swing arm 7372 and the wire 734.

On the other hand, when the adjustment knob 7392 is rotated backward to move retract the distal end portion 7393, the movable restraining member 7391 returns toward the adjustment knob 7392, and the biasing force of the coil spring 7375 is reduced. In view of this, the biasing force of the coil spring 7375 that biases the swing arm 7372 in the lifting direction of the prize acquisition unit 6 is reduced, and as a result, there is also a reduction in the biasing force in the lifting direction that is exerted on the prize acquisition unit 6 itself via the swing arm 7372 and the wire 734.

The approach stop sensor 7376 is a sensor that can send the control unit 15 a request to stop the approach movement of the main body 60 based on the detected state of the Z direction dog 7373 when the main body 60 is undergoing approach movement. More specifically, when the main body 60 continues its approach movement and the bottom part 67 of the main body 60 does not come into contact with a prize, the force in the Z direction descent direction exerted on the wire 734 is greater than the force in the Z direction ascent direction exerted on the wire 734. In this case, the force exerted on the wire 734 in the Z direction descent direction is the sum of the weight of the main body 60, the weight of some or all of the support 731, and some of the weight of the cable 62. The force exerted on the wire 734 in the Z direction ascent direction is a biasing force in the lifting direction produced by the coil spring 7375. Therefore, the wire 734 is in a tensioned state, as shown in FIG. 6. In this case, the Z direction dog 7373 is located on the rear side of the approach stop sensor 7376, as shown in FIG. 6. Therefore, since the approach stop sensor 7376 detects the Z direction dog 7373, a request to stop the approach movement of the main body 60 is not sent to the control unit 15. As a result, under the control of the control unit 15, the third motor 733 continues to drive the wire winding pulley 735, so the main body 60 continues its approach movement.

On the other hand, when the bottom part 67 of the main body 60 makes contact with a prize and presses against the prize with a specific pressure, the force exerted on the wire 734 in the Z direction descent direction is less than the force exerted on the wire 734 in the Z direction ascent direction. In this case, the force exerted on the wire 734 in the Z direction descent direction is the sum of the weight of the main body 60, the weight of some or all of the support 731, and some of the weight of the cable 62. On the other hand, the force exerted on the wire 734 in the Z direction ascent direction is a combination of the biasing force in the lifting direction by the coil spring 7375 and the reaction force against the above-mentioned total weight attributable to the prize. Therefore, the tension applied to the wire 734 is relaxed, as shown in FIG. 7. Then, the action of the coil spring 7375 causes the Z direction dog 7373 to swing upward along with the swing arm 7372. Consequently, the approach stop sensor 7376 can no longer detect the Z direction dog 7373, and a request to stop the approach movement of the main body 60 is sent to the control unit 15. As a result, under the control of the control unit 15, the third motor 733 stops driving the wire wind-up pulley 735, so the approach movement of the main body 60 is stopped.

The ascent stop sensor is a sensor for detecting whether the main body 60 has returned to a specific point located above in the Z direction (for example, an approach starting point or an arbitrary point in the specific plane 601). When it has been detected that the main body 60 has returned to a specific point above in the Z direction, the ascent stop sensor sends a request to the control unit 15 to stop the ascent movement of the main body 60. As a result, under the control of the control unit 15, the third motor 733 stops driving the wire wind-up pulley 735, so the ascent movement of the main body 60 is stopped. On the other hand, when it is not detected that the main body 60 has returned to a specific point above in the Z direction, the ascent stop sensor does not send a request to the control unit 15 to stop the approach movement of the main body 60. As a result, under the control of the control unit 15, the third motor 733 continues to drive the wire wind-up pulley 735, so the ascent movement of the main body 60 continues.

In the following description, the X direction origin sensor 715, the three X direction position sensors 714, the Y direction origin sensor 725, and the three Y direction position sensors 724 of the drive unit 7 may be collectively referred to as "position sensors," the first motor 712, the second motor 722, and the third motor 733 may be collectively referred to as a "motor," and the first encoder 713 and the second encoder 723 may be collectively referred to as an "encoder."

Details of Control Unit 15

Figure 8:
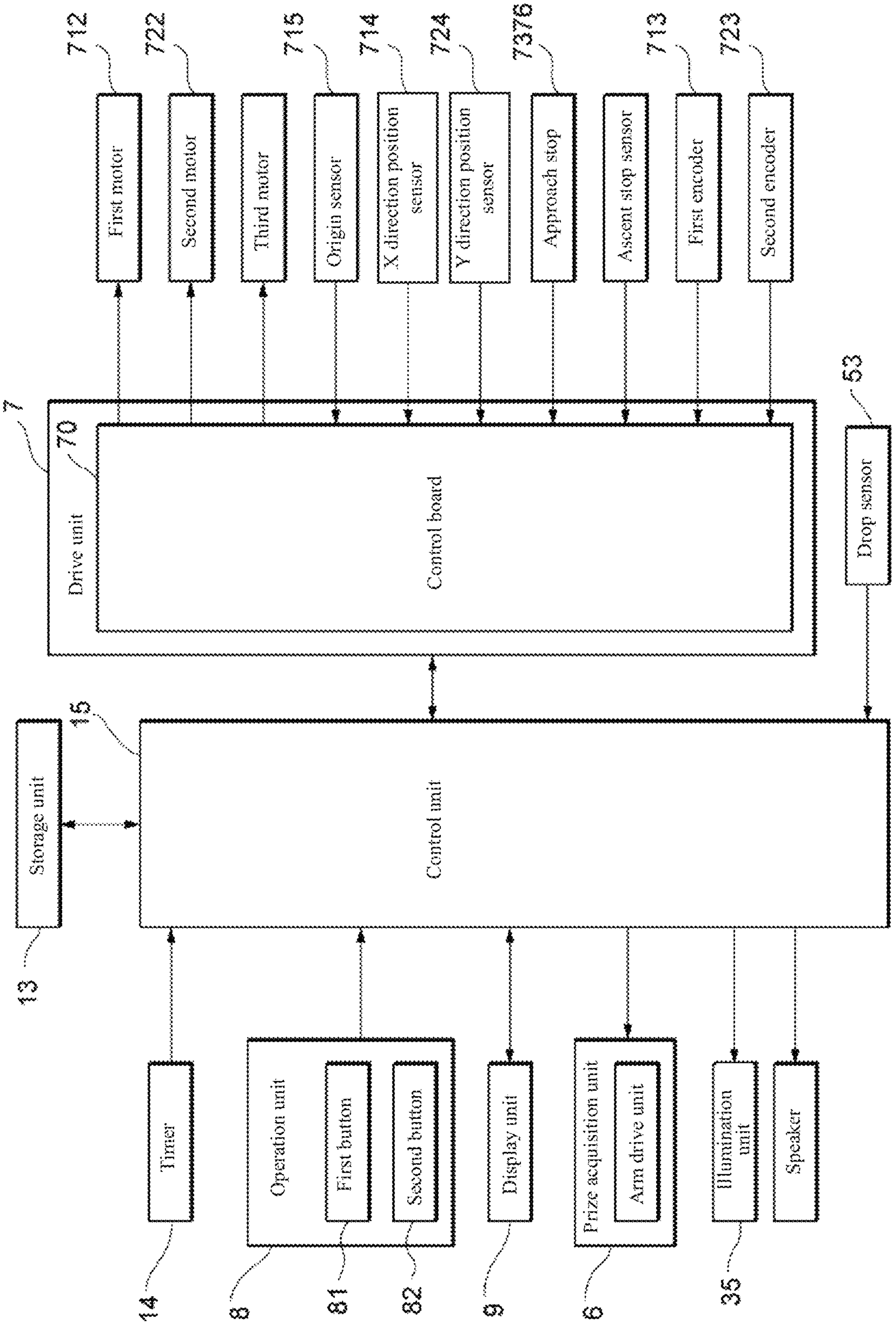
FIG. 8 is a diagram showing the functional configuration of a control unit of the prize acquisition game machine according to one or more embodiments.
Figure 9:
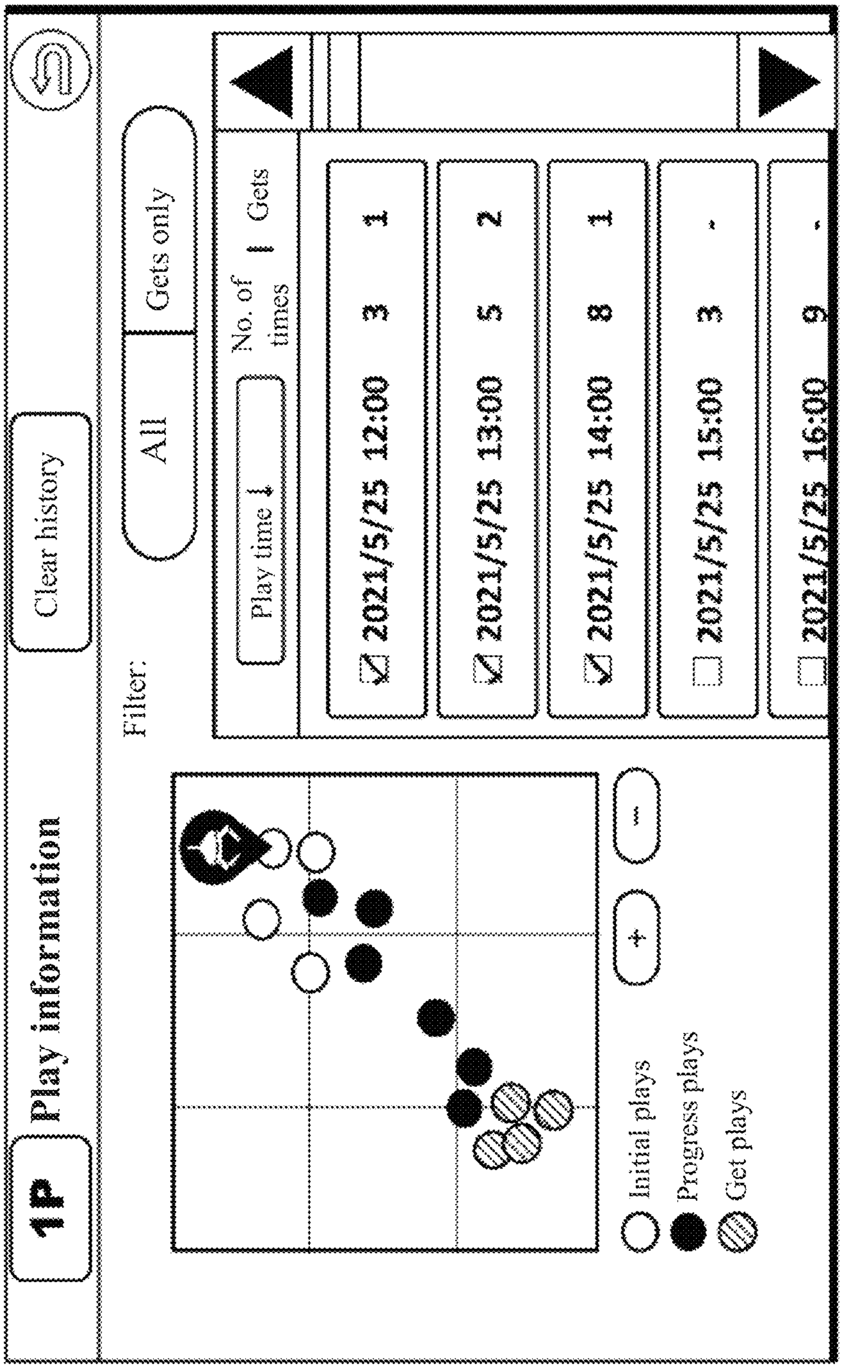
FIG. 9 is a diagram showing the display on the display unit of the prize acquisition game machine according to one or more embodiments.
Figure 10:
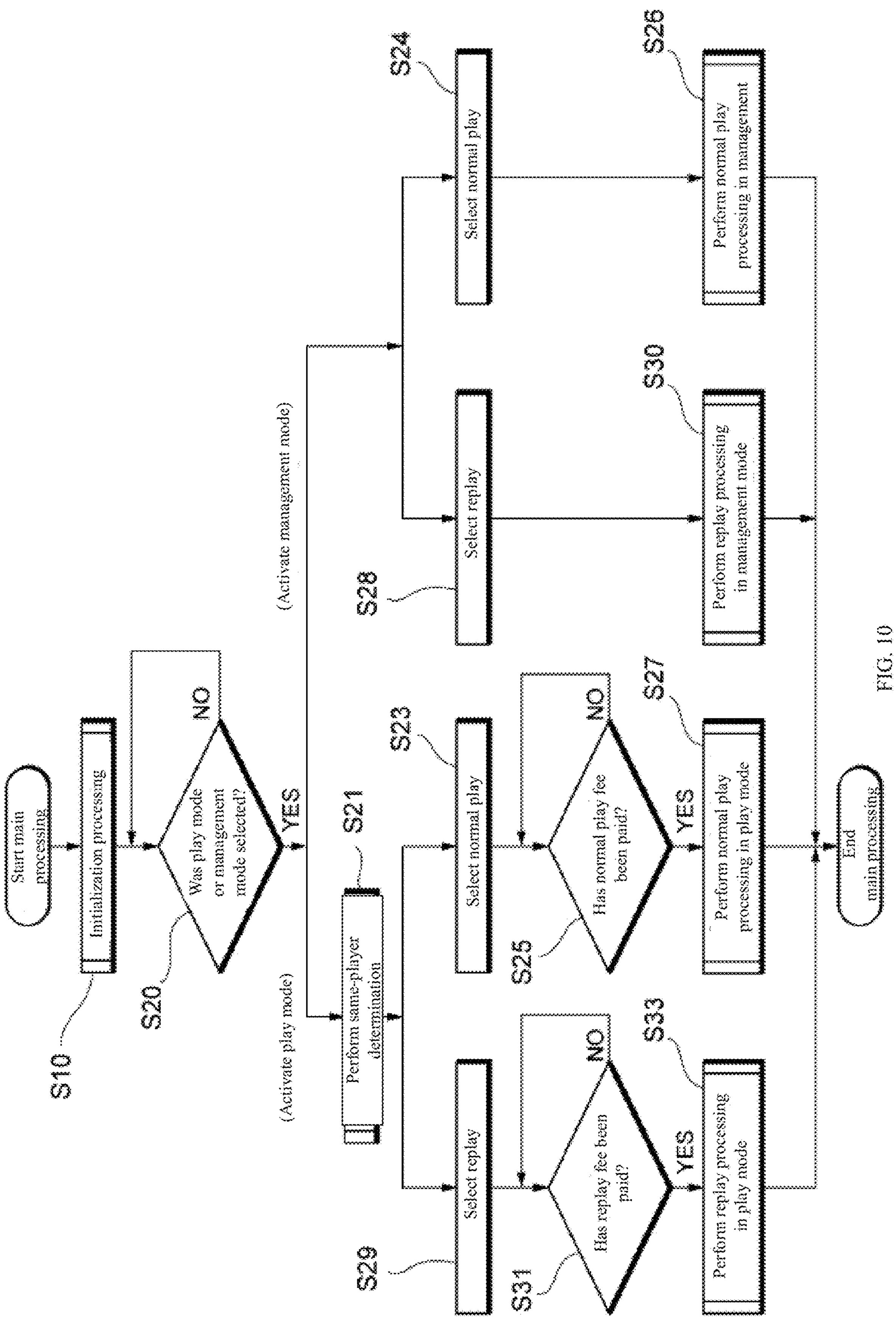
FIG. 10 is a flowchart illustrating the main processing control of the prize acquisition game performed by the control unit of the prize acquisition game machine according to one or more embodiments.
Figure 11:
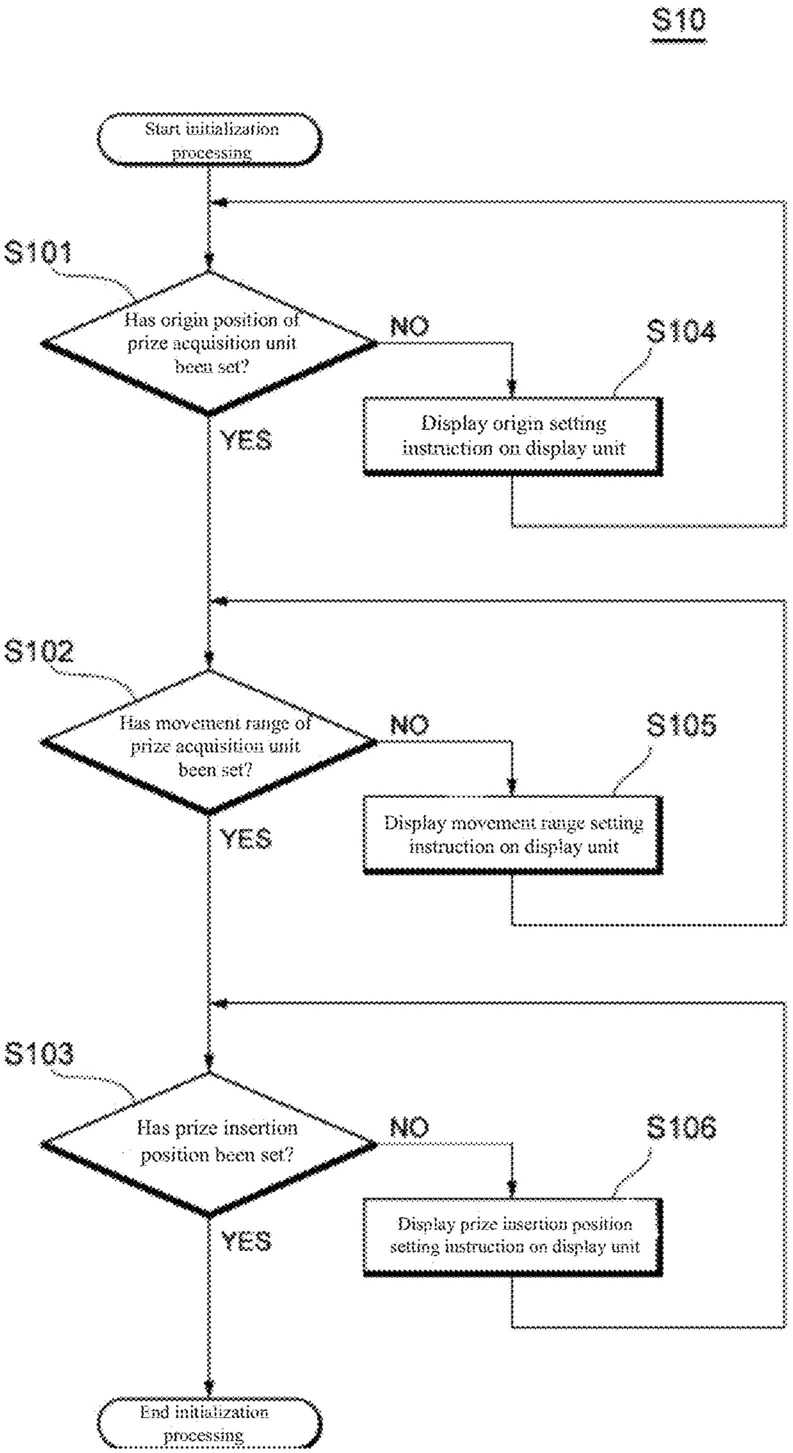
FIG. 11 is a flowchart illustrating the details of step S10 in FIG. 10.
Figure 12:
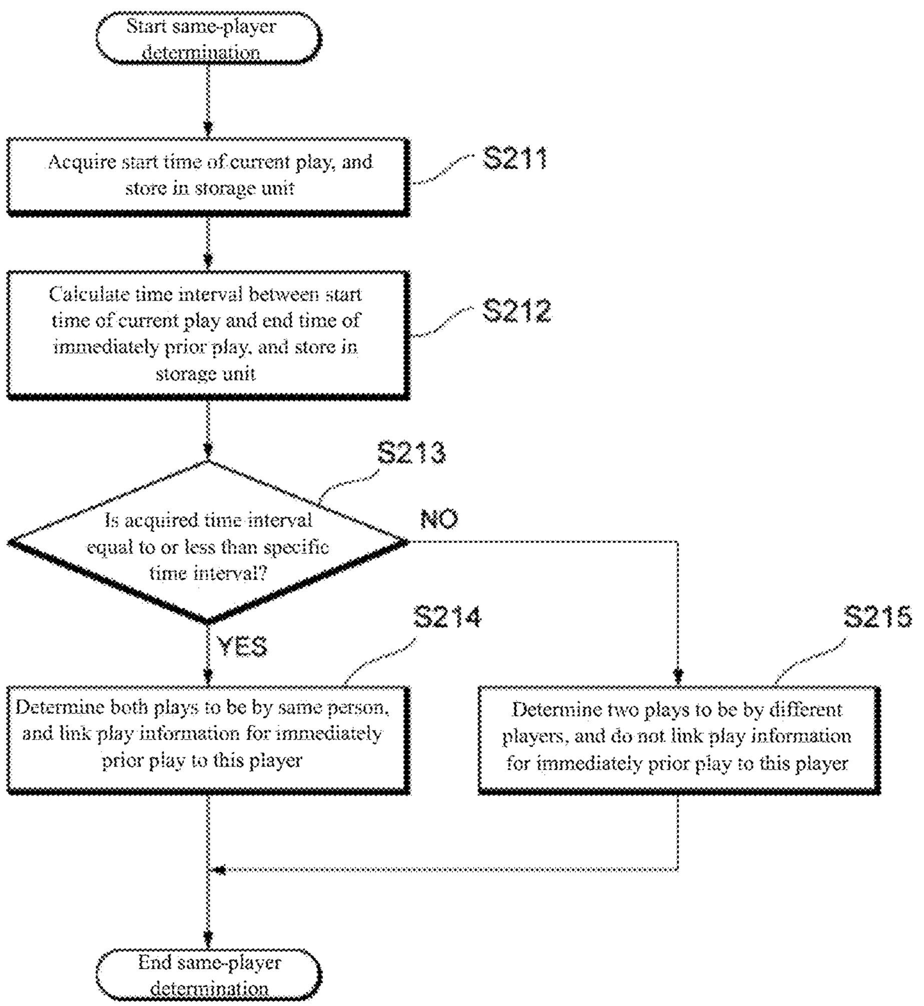
FIG. 12 is a flowchart illustrating the details of step S21 in FIG. 10.
Figure 13:
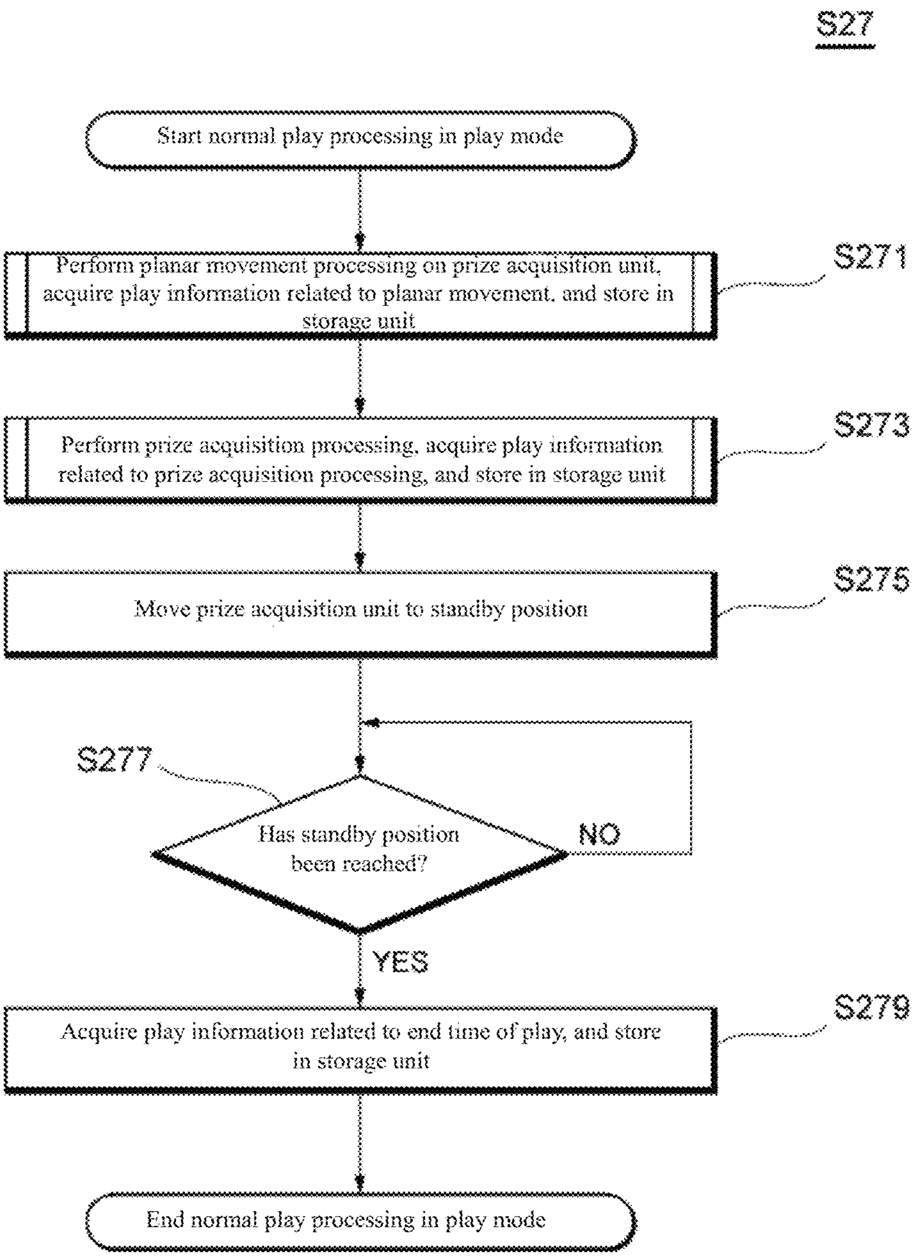
FIG. 13 is a flowchart illustrating the details of step S27 in FIG. 10.
Figure 14:
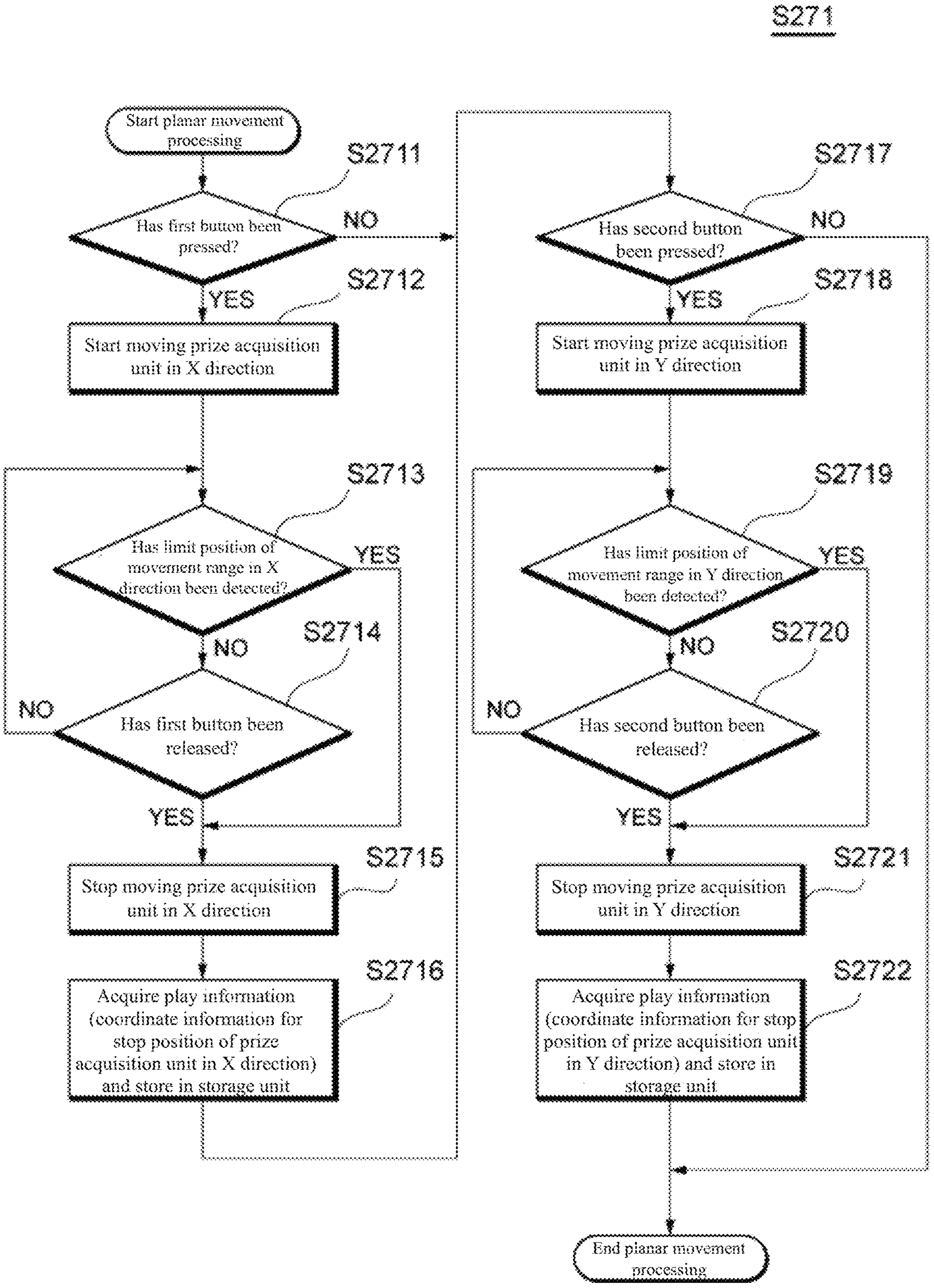
FIG. 14 is a flowchart illustrating the details of step S271 in FIG. 13.
Figure 15:
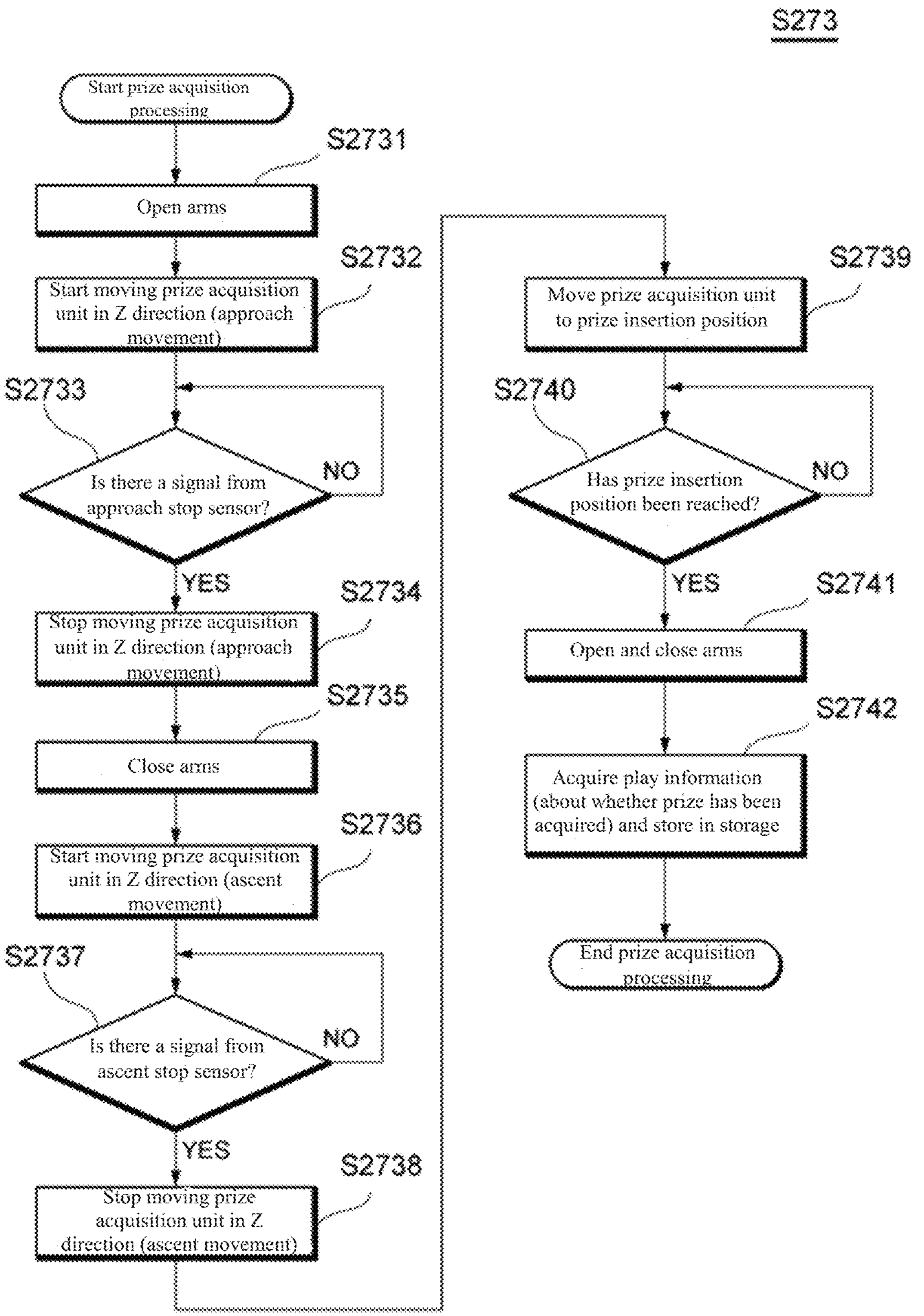
FIG. 15 is a flowchart illustrating the details of step S273 in FIG. 13.
Figure 16:
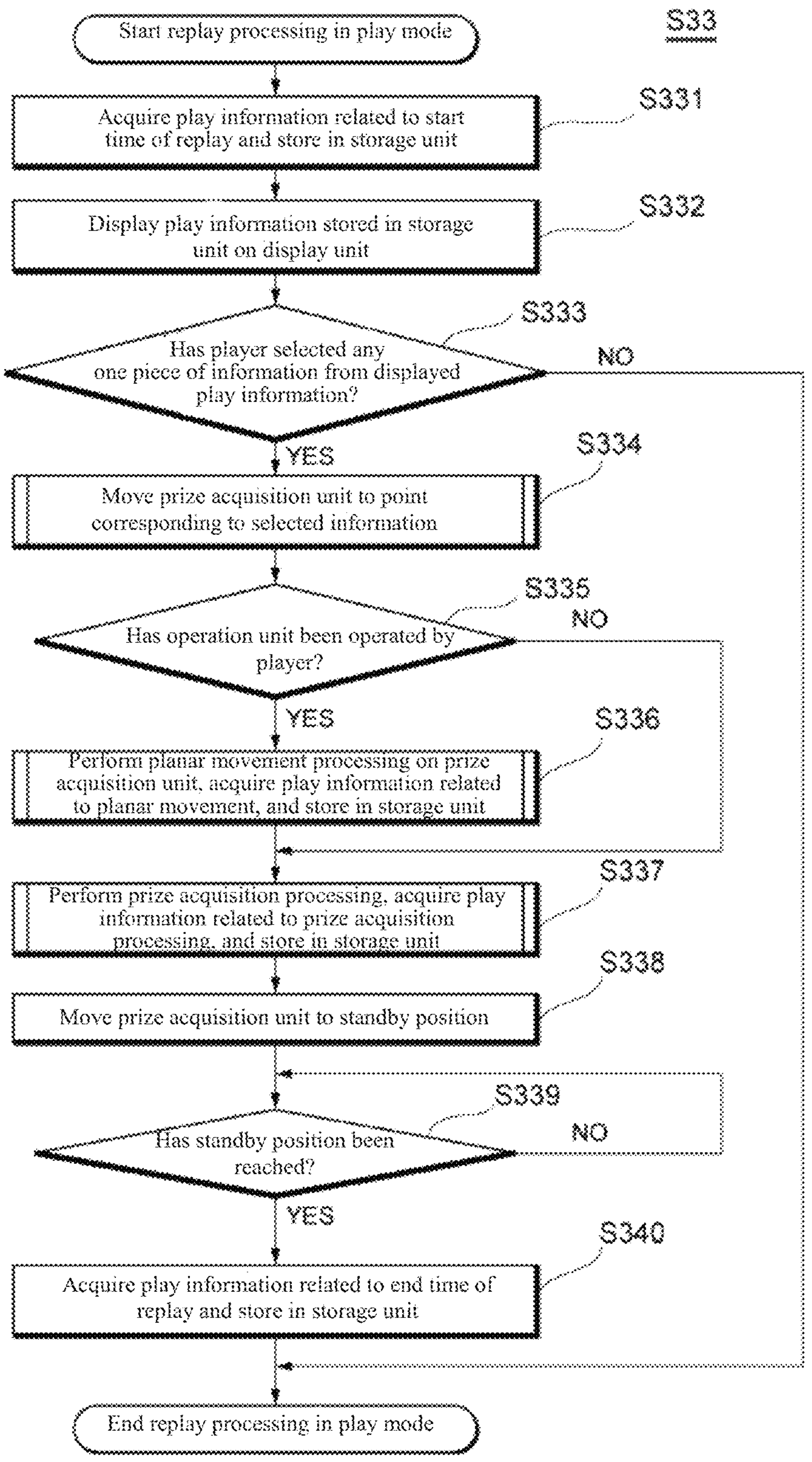
FIG. 16 is a flowchart illustrating the details of step S33 in FIG. 10.
Figure 17:
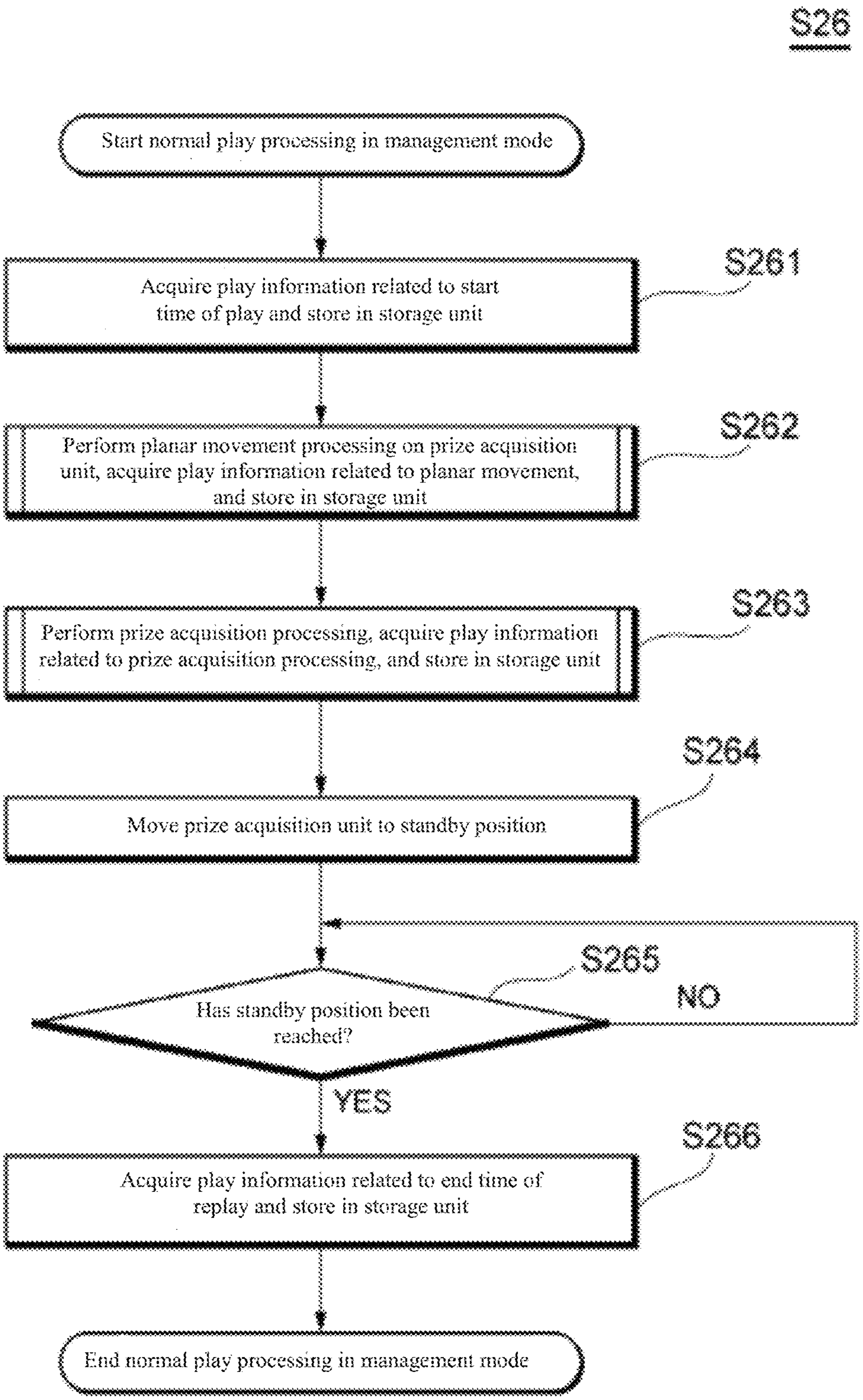
FIG. 17 is a flowchart illustrating the details of step S26 in FIG. 10.
Figure 18:
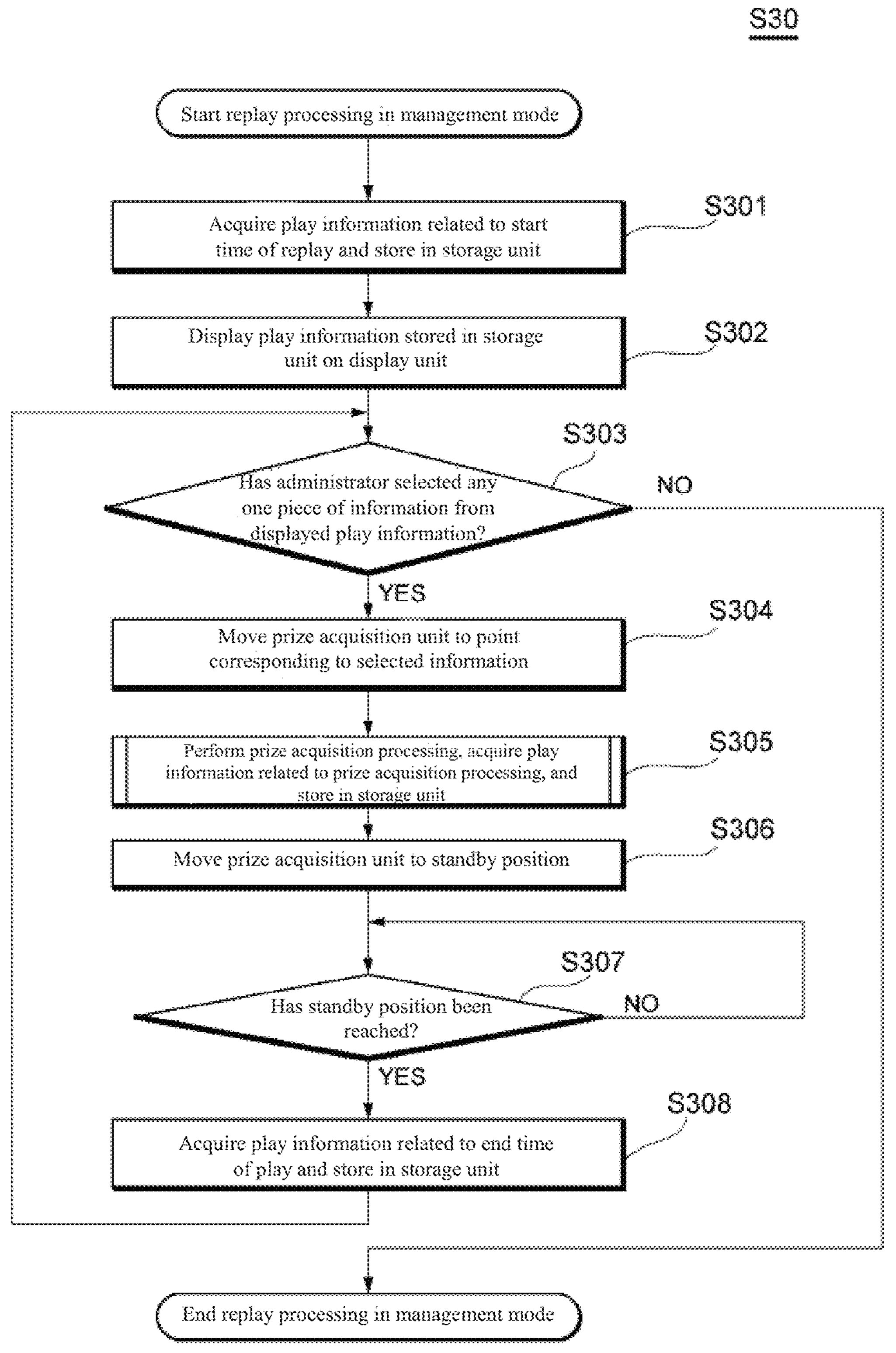
FIG. 18 is a flowchart illustrating the details of step S30 in FIG. 10.

Details of the control unit 15 will now be described with reference to FIGS. 8 to 18. FIG. 8 is a diagram showing the functional configuration of the control unit 15. FIG. 9 is a diagram showing a display on the display unit. FIG. 10 is a flowchart illustrating main processing control of a prize acquisition game by the control unit 15. FIGS. 11 to 13 are flowcharts illustrating details of steps S10, S21, and S27 in FIG. 10. FIGS. 14 and 15 are flowcharts illustrating details of steps S271 and S273 in FIG. 13. FIGS. 16 to 18 are flowcharts illustrating details of steps S33, S26, and S30 in FIG. 10.

Functional Configuration of Control Unit 15

As shown in FIG. 8, the control unit 15 may comprise a central processing unit (CPU), a random access memory (RAM), and read only memory (ROM), and is connected to the storage unit 13, the timer 14, the operation unit 8, the display unit 9, an arm drive unit of the prize acquisition unit 6, the illumination unit 35, the speaker, a control board 70 of the drive unit 7, and the drop detector 53. Also, the control unit 15 is connected to the position sensors, motors, and encoders of the drive unit 7 via connection with the control board 70. Thus, when it is detected that the user has inserted a specific play fee into the coin slot 10, the control unit 15 controls the above components to cause them to execute a prize acquisition game.

More specifically, upon receiving the movement request inputted by the user via the operation unit 8 or the display unit 9 and the time information acquired by the timer 14, the control unit 15 drives the arm drive unit of the prize acquisition unit 6 and the motors of the drive unit 7 based on the data and instructions or program stored in the storage unit 13, moves the main body 60 of the prize acquisition unit 6 (planar movement and Z direction movement) and opens and closes the pair of arms 61, thereby executing a prize acquisition game. Here, in the movement of the main body 60, the control unit 15 causes the main body 60 to perform planar movement and then Z direction movement, for example. Also, the control unit 15 executes output control of the illumination unit 35, the speaker, etc., in order to output lighting effects or sound effects according to the progress of the prize acquisition game, etc.

Also, the control unit 15 receives play information for each of a plurality of plays of the prize acquisition unit 6 moved by the second method, which is transmitted from the position sensors of the drive unit 7, the drop detector 53, and the timer 14, or movement information on the prize acquisition unit 6 moved by the first method, and can store this information in the storage unit 13.

Here, the play information includes movement information and play history corresponding to each play. The movement information is acquired by the position sensors and encoders of the drive unit 7 about past movements of the prize acquisition unit 6 that was moved by the first method and second method in the game space S. More specifically, the movement information includes coordinate information of a specific point on the movement path corresponding to a past movement of the prize acquisition unit 6 (such as the coordinates of the origin, coordinate information on the approach starting point, and coordinate information on the direction change point), and movement range information for the prize acquisition unit. The play history includes the time at which each play was performed, which is acquired by the timer 14, whether a prize was acquired corresponding to each play, which was acquired by the drop detector 53, the number of consecutive plays to acquire one prize, the number of prizes obtained through continuous play, and so forth. The determination of continuous play by the control unit 15 will be described in conjunction with a same-player determination made by the control unit 15 (discussed below).

Also, the control unit 15 can output play information including movement information and a play history of each play for each of a plurality of plays. In this case, the control unit 15 determines whether the player corresponding to each of the plays is the same person, and if it is determined that the player is the same person, the control unit 15 can output play information corresponding to each of the plays to the display unit 9 linked to that player.

Here, if a new play has started, the same-player determination by the control unit 15 is performed by comparing the time interval between the start time of the new play and the end time of the play immediately prior to this new play, as acquired by the timer 14. If the time interval between the two is less than or equal to a specific time interval (such as 60 seconds), the control unit 15 determines that the player of the new play and the play immediately prior to the new play is the same person. In other words, the new play and the play immediately prior to the new play are consecutive plays by a single player. In a state where the player keeps the game by exchanging money, the control unit 15 stops the timer 14 from counting the time while the game is being kept.

Also, the control unit 15 can change the order in which the play information is outputted based on the play history. In this case, the control unit 15 can output the play information starting with the earliest start time of each play included in the play history of the play information, as shown on the right side of FIG. 9, for example.

Also, as shown on the left side of FIG. 9, the control unit 15 can plot a symbol corresponding to the movement information of the prize acquisition unit 6 on the display unit 9 at a position corresponding to the movement information on the image representing the game space S. In this case, as shown in FIG. 9, for example, the control unit 15 classifies symbols corresponding to the movement information of the prize acquisition unit 6 corresponding to each play, and then plots the symbols at positions corresponding to the movement information on an image representing the specific plane 601 of the game space S. Also, the symbols corresponding to the movement information of the prize acquisition unit 6 may be classified into three types: an initial play performed by the player for the first time, a get play in which a prize was acquired, and a progress play that is something other than an initial play or a get play. Also, each type of symbol may be displayed in a different color or shape.

Also, the control unit 15 can cause the movement of the prize acquisition unit 6 to be reproduced based on the movement information stored in the storage unit 13. In this case, for example, when the user selects any one approach starting point for the prize acquisition unit 6 from among the movement information displayed on the display unit 9, the control unit 15 refers to the coordinate information on the approach starting point selected by the user, and can move the prize acquisition unit 6 to this approach starting point for a replay.

Also, the control unit 15 can move the prize acquisition unit 6 within the movement range defined in the movement range information. Here, the movement range information is information that is acquired by the position sensors and the encoders of the drive unit 7 and sent to the control unit 15 when the prize acquisition unit 6 is moved by the first method.

Also, the control unit 15 can perform processing related to the management mode used by the administrator, and processing related to the play mode used by the player. Here, the management mode is a usage mode in which the administrator performs maintenance, makes settings, performs test play, etc., for the prize acquisition game machine 1, for example. More specifically, in the management mode, the control unit 15 can acquire play information related to the movement of the prize acquisition unit 6, etc., and store the acquired play information in the storage unit 13. Similarly, in the play mode, the control unit 15 can acquire play information related to the movement of the prize acquisition unit 6, etc., and store the acquired play information in the storage unit 13.

Main Processing Control by Control Unit 15

An example of the main processing of the prize acquisition game performed by the control unit 15 will now be described in detail with reference to FIG. 1 and FIGS. 10 to 18. Depending on the settings, the control unit 15 can perform main processing of different prize acquisition games.

Step S10

First, the control unit 15 performs initialization processing (step S10).

In step S10, as shown in FIG. 11, the control unit 15 first determines whether the origin position of the prize acquisition unit 6 has been set (step S101). If it is determined that the origin position of the prize acquisition unit 6 has been set (Yes in step S101), the control unit 15 determines whether the movement range of the prize acquisition unit 6 has been set (step S102). If it is determined that the movement range of the prize acquisition unit 6 has been set (Yes in step S102), the control unit 15 determines whether the prize insertion position of the prize acquisition unit 6 has been set (step S103). If it is determined that the prize insertion position of the prize acquisition unit 6 has been set (Yes in step S103), the control unit 15 terminates the initialization process.

On the other hand, if it is determined that the origin position of the prize acquisition unit 6 has not been set (No in step S101), the control unit 15 displays an origin setting instruction on the display unit 9 (step S104). In this case, the administrator can manually move the prize acquisition unit 6 to the standby position using the first method based on the origin setting instruction. When the prize acquisition unit 6 stops at its standby position, the X direction origin sensor 715 and the Y direction origin sensor 725 of the drive unit 7 acquire the coordinates of the standby position of the prize acquisition unit 6 and send them to the control unit 15. The control unit 15 then sets the standby position as the origin and stores this information in the storage unit 13, and the processing moves on to step S102.

Similarly, if it is determined that the movement range of the prize acquisition unit 6 has not been set (No in step S102), the control unit 15 displays on the display unit 9 an instruction to set the movement range (step S105). In this case, the administrator can manually move the prize acquisition unit 6 along the desired movement range by the first method based on an instruction to set the movement range. Then, the X direction position sensor 714, the Y direction position sensor 724, the first encoder 713, and the second encoder 723 of the drive unit 7 acquire the coordinates of points on the movement path and send these to the control unit 15. The control unit 15 then stores the movement range information in the storage unit 13, and the processing moves on to step S103.

Also, if it is determined that the prize insertion position of the prize acquisition unit 6 has not been set (No in step S103), the control unit 15 displays on the display unit 9 an instruction to set the prize insertion position (step S106). In this case, the administrator can manually move the prize acquisition unit 6 to the desired prize insertion position by the first method based on the instruction to set the prize insertion position. Then, the X direction position sensor 714, the Y direction position sensor 724, the first encoder 713, and the second encoder 723 of the drive unit 7 acquire the coordinates of points on the movement path and transmit these to the control unit 15. Then, the control unit 15 stores the prize insertion position information in the storage unit 13, and then terminates the initialization process.

Step S20

The description will now return to FIG. 10. Next, the control unit 15 determines whether either the play mode or the management mode has been selected (step S20). Here, the play mode and the management mode are selected in advance by the administrator before the main processing is commenced, for example. Also, in the play mode processing performed by the control unit 15, play information is linked to the play mode and stored in the storage unit 13. On the other hand, in the management mode processing performed by the control unit 15, play information is linked to the management mode and stored in the storage unit 13.

Step S21

If it is determined in step S20 that the play mode has been selected, the control unit 15 turns on the play mode and performs same-player determination processing (step S21).

In step S21, as shown in FIG. 12, the control unit 15 first acquires play information related to the start time of the current play and stores it in the storage unit 13 (step S211), and then calculates play information related to the time interval between the start time of the current play and the end time of the immediately prior play stored in the storage unit 13, and stores this in the storage unit 13 (step S212). Next, the control unit 15 determines whether the acquired time interval is less than or equal to a specific time interval (such as 60 seconds) (step S213). If it is determined that the time interval is less than or equal to the specific time interval (Yes in step S213), the control unit 15 determines that both plays were done by the same person, links the play information for the immediately prior play, or play information linked to the play information for the immediately prior play, to this player (step S214), and ends the same-player determination processing.

On the other hand, if it is determined that the specific time interval has been exceeded (No in step S213), the control unit 15 determines that the two plays were not done by the same person, and ends the same-player determination processing without linking to the same player the play information for the immediately prior play, or the play information linked to the play information for the immediately prior play (step S215).

Steps S23, S25, and S27

The description will now return to FIG. 10. Next, when the player has selected normal play, the control unit 15 starts normal play processing in the play mode (step S23), and determines whether the player has paid the normal play fee (step S25). If it is determined that the player has paid the normal play fee (Yes in step S25), the control unit 15 performs normal play processing in the play mode (step S27). On the other hand, if it is determined that the player has not paid the normal play fee (No in step S25), the control unit 15 returns the processing to step S25 and waits for the player to pay the normal play fee.

Details of Step S27

In step S27, as shown in FIG. 13, the control unit 15 first performs planar movement processing on the prize acquisition unit 6, acquires play information related to planar movement, and stores this in the storage unit 13 (step S271). After the planar movement processing is completed, prize acquisition processing is performed, and play information related to the prize acquisition processing is acquired and stored in the storage unit 13 (step S273). The control unit 15 then moves the prize acquisition unit 6 to the standby position (step S275), and determines whether the prize acquisition unit 6 has arrived at the standby position (step S277). If it is determined that the prize acquisition unit 6 has arrived at the standby position (Yes in step S277), the control unit 15 acquires play information related to the end time of the play, stores this in the storage unit 13 (step S279), and ends normal play processing in the play mode. On the other hand, if it is determined that the prize acquisition unit 6 has not arrived at the standby position (No in step S277), the control unit 15 returns the processing to step S277.

Details of Step S271

Here, details of the planar movement processing of the prize acquisition unit 6 pertaining to step S271 will be described through reference to FIG. 14.

In step S271, that is, when the planar movement processing of the prize acquisition unit 6 is commenced, the control unit 15 first causes the prize acquisition unit 6 to move in the X direction, as shown in FIG. 14. More specifically, the control unit 15 determines whether the first button 81 has been pressed by the player (step S2711). If it is determined that the first button 81 has been pressed by the player (Yes in step S2711), the control unit 15 actuates the first motor 712 based on the operation signal from the first button 81 to start moving the prize acquisition unit 6, which was located at the standby position (origin), in the X direction (step S2712). Next, the control unit 15 determines whether the prize acquisition unit 6 has moved to the limit position of its movement range in the X direction based on a movement limit detection signal from the X direction dog 716 (step S2713). If it is determined that the prize acquisition unit 6 has not moved to the limit position of its movement range in the X direction (No in step S2713), the control unit 15 determines whether the player has released the first button 81 (step S2714). If it is determined that the player has released the first button 81 (Yes in step S2714), the control unit 15 stops the movement of the prize acquisition unit 6 in the X direction (step S2715). After step S2715 is performed, the prize acquisition unit 6 is located at the stop position of its movement in the X direction, that is, at the direction change point. The control unit 15 then acquires the play information sent by the position sensors and encoders of the drive unit 7, that is, the coordinate information on the direction change point, and stores this in the storage unit 13 (step S2716).

After this, the control unit 15 causes the prize acquisition unit 6 to move in the Y direction. More specifically, the control unit 15 determines whether the second button 82 has been pressed by the player (step S2717). If it is determined that the second button 82 has been pressed by the player (Yes in step S2717), the control unit 15 actuates the second motor 722 based on the operation signal from the second button 82 to start moving the prize acquisition unit 6, which is located at the direction change point, in the Y direction (step S2718). Next, the control unit 15 determines whether the prize acquisition unit 6 has moved to the limit position of its movement range in the Y direction based on the movement limit detection signal from the Y direction dog 726 (step S2719). If it is determined that the prize acquisition unit 6 has not moved to the limit position of its movement range in the Y direction (No in step S2719), the control unit 15 determines whether the player has released the second button 82 (step S2720). If it is determined that the player has released the second button 82 (Yes in step S2720), the control unit 15 stops the movement of the prize acquisition unit 6 in the Y direction (step S2721). After step S2721 is performed, the prize acquisition unit 6 is located at the stop position of its movement in the Y direction, that is, at the approach starting point. The control unit 15 then acquires the play information sent by the position sensors and encoders of the drive unit 7, that is, the coordinate information on the approach starting point, stores this in the storage unit 13 (step S2722), and ends the planar movement processing.

On the other hand, in the above planar movement processing, if it is determined that the first button 81 has not been pressed by the player (No in step S2711), the control unit 15 moves the processing to step S2717. If it is determined that the prize acquisition unit 6 has moved to the limit position of its movement range in the X direction (Yes in step S2713), the control unit 15 moves the processing to step S2715. If it is determined that the player has not released the first button 81 (No in step S2714), the control unit 15 returns the processing to step S2713. If it is determined that the second button 82 has not been pressed by the player (No in step S2717), the control unit 15 ends the planar movement processing. If it is determined that the prize acquisition unit 6 has moved to the limit position of its movement range in the Y direction (Yes in step S2719), the control unit 15 moves the processing to step S2721. If it is determined that the player has not released the second button 82 (No in step S2720), the control unit 15 returns the processing to step S2719.

Details of Step S273

Details of the prize acquisition processing pertaining to step S273 will be described with reference to FIG. 15.

When step S273, that is, the prize acquisition processing of the prize acquisition unit 6, is commenced, as shown in FIG. 15, the control unit 15 causes the prize acquisition unit 6 to move in the Z direction (descent movement) and grab the prize. More specifically, the control unit 15 actuates the arm drive unit of the prize acquisition unit 6 to open the pair of arms 61 of the prize acquisition unit 6 at the approach starting point by a set degree of opening (step S2731). The control unit 15 then actuates the third motor 733 to start moving the prize acquisition unit 6 in the Z direction (step S2732). In step S2732, the Z direction movement of the prize acquisition unit 6 is descent movement. Next, the control unit 15 determines whether there is a detection signal from the approach stop sensor 7376 indicating detection that the bottom part 67 of the main body 60 of the prize acquisition unit 6 is pressing against the prize at a specific pressure (step S2733). If it is determined that there is a detection signal from the approach stop sensor 7376 (Yes in step S2733), the control unit 15 stops the Z direction movement of the prize acquisition unit 6 (step S2734). The control unit 15 then actuates the arm drive unit of the prize acquisition unit 6 to close the pair of arms 61, thereby causing the prize to be grabbed (step S2735).

The control unit 15 then causes the prize acquisition unit 6 to move to the prize insertion position. More specifically, after the pair of arms 61 have been closed, the control unit 15 actuates the third motor 733 to start moving the prize acquisition unit 6 in the Z direction (step S2736). In step S2738, the Z direction movement of the prize acquisition unit 6 is ascent movement. Next, the control unit 15 determines whether there is a request from the ascent stop sensor to stop the ascent movement (step S2737). If it is determined that there is a request from the ascent stop sensor to stop the ascent movement (Yes in step S2737), the control unit 15 stops ascent movement of the prize acquisition unit 6 in the Z direction (step S2738). Next, the control unit 15 actuates the second motor 722 and then the first motor 712 to move the prize acquisition unit 6 toward the prize insertion position (step S2739). In step S2739, the control unit 15 causes the prize acquisition unit 6 to move in the Y direction and the X direction. The control unit 15 then determines whether the prize acquisition unit 6 has reached the prize insertion position (step S2740). If it is determined that the prize acquisition unit 6 has reached the prize insertion position (Yes in step S2740), the control unit 15 actuates the arm drive unit of the prize acquisition unit 6 to open and then close the pair of arms 61 (step S2741).

Here, if the pair of arms 61 have grabbed the prize in step S2735, the pair of arms 61 are opened in step S2741 to drop the prize through the first drop opening 51. When the prize drops, the prize passes through the second drop opening 52 and is temporarily accommodated in the prize accommodating unit 11. Also, the prize is detected by the drop detection sensor 53 upon passing through the second drop opening 52. Consequently, it can be detected whether a prize is acquired in each play. The control unit 15 then acquires play information, which is sent by the drop detector 53, related to information on whether a prize has been acquired, stores this in the storage unit 13 (step S2742), and ends the prize acquisition processing. At this point the control unit 15 ends the main processing.

On the other hand, if it is determined that there is no detection signal from the approach stop sensor 7376 (No in step S2733), the control unit 15 returns the processing to step S2733. If it is determined that there is no request from the ascent stop sensor to stop the ascent movement (No in step S2737), the control unit 15 returns the processing to step S2737. If it is determined that the prize acquisition unit 6 has not moved to the limit position of its movement range in the Z direction (No in step S2739), the control unit 15 returns the processing to step S2739. If it is determined that the prize acquisition unit 6 has not reached the prize insertion position (No in step S2740), the control unit 15 returns the processing to step S2740.

Steps S29, S31, and S33

The description will now return to FIG. 10. If the player has selected replay, the control unit 15 starts replay processing in the play mode (step S29), and determines whether the player has paid the replay fee (step S31). If it is determined that the player has paid the replay fee (Yes in step S31), the control unit 15 performs replay processing in the play mode (step S33). On the other hand, if it is determined that the player has not paid the regular play fee (No in step S31), the control unit 15 returns the processing to S31 and waits for the player to pay the replay fee.

Details of Step S33

In step S33, as shown in FIG. 16, the control unit 15 first acquires play information related to the start time of the replay, and stores this in the storage unit 13 (step S331). Next, the control unit 15 causes the display unit 9 to display the play information stored in the storage unit 13 (step S332), and determines whether the player has selected any one piece of information from the play information (step S333). If it is determined that the player has selected any one piece of information from the play information (Yes in step S333), the control unit 15 moves the prize acquisition unit 6 to the point corresponding to the selected information, that is, reproduces the planar movement of the prize acquisition unit 6 (step S334).

The control unit 15 then determines whether the player has operated the operation unit (step S335). If it is determined that the player has operated the operation unit (Yes in step S335), the control unit 15 performs planar movement processing on the prize acquisition unit 6 based on the movement request inputted by the player's operation, acquires play information related to the planar movement, and stores this in the storage unit 13 (step S336). After the planar movement processing is completed, prize acquisition processing is performed, play information related to the prize acquisition processing is acquired, and this is stored in the storage unit 13 (step S337). The control unit 15 then moves the prize acquisition unit 6 to its standby position (step S338), and determines whether the prize acquisition unit 6 has arrived at the standby position (step S339). If it is determined that the prize acquisition unit 6 has arrived at the standby position (Yes in step S339), the control unit 15 acquires play information related to the end time of the replay, stores this in the storage unit 13 (step S335), and ends replay processing in the play mode.

On the other hand, if it is determined that the player has not selected any one piece of information from the play information (No in step S333), the control unit 15 ends the replay processing in the play mode. If it is determined that the player has operated the operation unit (No in step S335), the control unit 15 moves the processing to step S337. If it is determined that the prize acquisition unit 6 has not arrived at the standby position (No in step S339), the control unit 15 returns the processing to step S339.

Here, since the planar movement processing in step S336 is the same as the planar movement process in step S271, the step S336 will not be described here. Similarly, since the prize acquisition processing in step S337 is the same as the prize acquisition processing in step S273, step S337 will not be described here.

Steps S24 and S26

The description will now return to FIG. 10. In step S20, if it is determined that management mode has been selected, the control unit 15 activates management mode. Next, if normal play has been selected by the administrator, the control unit 15 starts normal play processing in management mode (step S24), and normal play processing is performed in management mode (step S26).

Details of Step S26

In step S26, as shown in FIG. 17, the control unit 15 first acquires play information related to the start time of the play, and stores this in the storage unit 13 (step S261). Next, the control unit 15 performs planar movement processing on the prize acquisition unit 6, acquires play information related to planar movement, and stores this in the storage unit 13 (step S262). After the planar movement processing is completed, prize acquisition processing is performed, play information related to the prize acquisition processing is acquired, and this is stored in the storage unit 13 (step S263). The control unit 15 then moves the prize acquisition unit 6 to the standby position (step S264), and determines whether the prize acquisition unit 6 has arrived at the standby position (step S265). If it is determined that the prize acquisition unit 6 has arrived at the standby position (Yes in step S265), the control unit 15 acquires play information related to the end time of the play, stores this in the storage unit 13 (step S266), and ends normal play processing in the play mode. On the other hand, if it is determined that the prize acquisition unit 6 has not arrived at the standby position (No in step S265), the control unit 15 returns the processing to step S265.

Steps S262 and S263

Here, since the planar movement processing in step S262 and the planar movement processing in step S271 in the play mode are the same except for the play information storage processing, step S262 will not be described. Similarly, since the prize acquisition processing in step S263 and the prize acquisition processing in step S273 are the same except for the play information storage processing, step S263 will not be described here. Also, in steps S262 and S263, play information is linked to the management mode and stored in the storage unit 13, whereas in steps S271 and S272, play information is linked to the play mode and stored in the storage unit 13.

Steps S28 and S30

The description will now return to FIG. 10. If replay has been selected by the administrator, the control unit 15 starts replay processing in management mode (step S28), and replay processing is performed in management mode (step S30).

Details of Step S30

In step S30, as shown in FIG. 18, the control unit 15 first acquires play information related to the start time of the play, and stores this in the storage unit 13 (step S301). Next, the control unit 15 causes the display unit 9 to display the play information stored in the storage unit 13 (step S302), and determines whether the administrator has selected any one piece of information from the displayed play information (step S303). If it is determined that the administrator has selected any one piece of information from the play information (Yes in step S303), the control unit 15 moves the prize acquisition unit 6 to the point corresponding to the selected information, that is, reproduces the planar movement of the prize acquisition unit 6 (step S304).

The control unit 15 then performs prize acquisition processing, acquires play information related to the prize acquisition processing, and stores this in the storage unit 13 (step S305). The control unit 15 then moves the prize acquisition unit 6 to the standby position (step S306), and determines whether the prize acquisition unit 6 has arrived at the standby position (step S307). If it is determined that the prize acquisition unit 6 has arrived at the standby position (Yes in step S307), the control unit 15 acquires play information related to the end time of the replay, stores this in the storage unit 13 (step S308), and returns the processing to step S303.

On the other hand, if it is determined that the administrator has not selected any one piece of information from the play information (No in step S303), the control unit 15 ends the replay processing in management mode to end the main processing.

Step S305

Here, since the prize acquisition processing in step S305 and the prize acquisition processing in step S273 are the same except for the play information storage processing, S305 will not be described. Also, in step S305, play information is linked to the management mode and stored in the storage unit 13, whereas in step S272, play information is linked to the play mode and stored in the storage unit 13.

The prize acquisition game machine 1 in the embodiments described above comprises a prize display unit 3 that has a game space S and that accommodates and displays prizes in the game space S, a prize acquisition unit 6 that is provided movably in the game space S and is used for acquiring prizes, a control unit 15 that controls the movement of the prize acquisition unit 6, and a storage unit 13 that stores movement information on past movements of the prize acquisition unit 6 in the game space S, wherein the control unit 15 is configured to control the movement of the prize acquisition unit 6 based on the movement information stored in the storage unit 13. As a result, the prize acquisition unit 6 can be moved by making use of movement information related to past movements of the prize acquisition unit 6. More specifically, when this configuration is employed, the administrator who manages the prize acquisition game machine 1 can reproducibly operate the prize acquisition unit 6 by moving the prize acquisition unit 6 based on past movement information on the prize acquisition unit 6, which allows the disposition of prizes and other such management to be performed accurately and easily while taking into account the probability of acquiring a prize. Also, it will be possible for a player who uses the prize acquisition game machine 1 to reproducibly operate the prize acquisition unit 6, which increases interest in the game by encouraging replays when acquiring a prize is almost within reach.

Also, in the prize acquisition game machine 1 according to the embodiments described above, the control unit 15 can cause the prize acquisition unit 6 to perform planar movement, which includes at least X direction movement (an example of a first movement in a first direction) and/or Y direction movement (an example of a second movement in a second direction), in a specific plane 601 within the game space S, based on a movement request inputted by a user, and after performing the planar movement, can cause the prize acquisition unit 6 to perform approach movement toward the prize in the Z direction descent direction (an example of a third movement in a third direction). As a result, the coordinate information used to reproduce the movement of the prize acquisition unit 6 can be easily acquired.

Also, in the prize acquisition game machine 1 according to the embodiments described above, the movement information includes coordinate information of the approach starting point, which is the position of the prize acquisition unit 6 after the planar movement is performed but before approach movement in the Z direction descent direction is performed, as a specific point on the movement path corresponding to a past movement of the prize acquisition unit 6, and/or coordinate information of the direction change point of movement in a plurality of directions in the event that the prize acquisition unit 6 has moved in a plurality of directions in the specific plane 601, and the control unit 15 can refer to the coordinate information to move the prize acquisition unit 6 to the direction change point or the approach starting point. As a result, the movement of the prize acquisition unit 6 can be reproduced easily and accurately.

Also, in the prize acquisition game machine 1 according to the embodiments described above, the movement information includes coordinate information of a specific point on the movement path corresponding to the past movement of the prize acquisition unit 6, and the control unit 15 can refer to the coordinate information to move the prize acquisition unit 6 to a specific point. As a result, the past movement of the prize acquisition unit 6 can be reproduced.

Also, in the prize acquisition game machine 1 according to the embodiments described above, the control unit 15 can move the prize acquisition unit 6 based on a movement request from the user after moving the prize acquisition unit 6 to a specific point. As a result, the past movement of the prize acquisition unit 6 can be reproduced, and the position of the prize acquisition unit 6 further adjusted, allowing a prize acquisition game to be picked up from a position that is more favorable for the player.

Also, in the prize acquisition game machine 1 according to the embodiments described above, the movement information includes coordinate information of a plurality of points as the coordinate information of a specific point, and the control unit 15 can move the prize acquisition unit 6 to one point selected by the user from the points. As a result, the movement of the prize acquisition unit 6 can be reproduced in accordance with the user's wishes.

Also, in the prize acquisition game machine 1 according to the embodiments described above, the coordinate information is coordinate information in a coordinate space with the standby position of the prize acquisition unit 6 as origin, the coordinate information includes the respective coordinate information in the coordinate space for the standby position, the movement range over which the prize acquisition unit 6 can move, and the prize insertion position at which the prize acquired by the prize acquisition unit 6 is dropped, and the standby position, the movement range, and the prize insertion position of the prize acquisition unit 6 are specified when the administrator of the prize acquisition game machine 1 manually moves the prize acquisition unit 6. As a result, the coordinates of the origin and other coordinates based on the coordinates of the origin can be easily acquired.

Also, in the prize acquisition game machine 1 according to the embodiments described above, the movement information includes movement range information on the prize acquisition unit 6, and the control unit 15 can control the prize acquisition unit 6 to move within the movement range determined by the movement range information. As a result, the prize acquisition unit 6 can move within the specified movement range.

Also, the prize acquisition game machine 1 according to the embodiments described above further comprises the operation unit 8 for operating the prize acquisition unit 6, wherein the movement information corresponds to past movements performed according to either a first method, which is a method in which the administrator of the prize acquisition game machine 1 manually moves the prize acquisition unit 6, or a second method, which is a method in which the control unit 15 moves the prize acquisition unit 6 based on a movement request inputted by the administrator or the player of the prize acquisition game machine 1 by operating the operation unit 8. As a result, the prize acquisition unit 6 can move within the specified movement range.

The prize acquisition game machine 1 according to the embodiments described above further comprises the drive unit 7 that drives the prize acquisition unit 6, wherein the drive unit 7 is provided with position sensors and encoders that sense the position of the prize acquisition unit 6, and the movement information is acquired based on the position sensors. As a result, movement range information can be easily and accurately acquired.

Also, in the prize acquisition game machine 1 according to the embodiments described above, the control unit 15 is configured to output play information including movement information and a play history of each of a plurality of plays, and the play history includes at least one of the times when each play was performed and whether a prize corresponding to each play was acquired. As a result, it is possible to accurately output play information linked to each player based on a same-player determination.

Also, in the prize acquisition game machine 1 according to the embodiments described above, the control unit 15 is configured to determine whether the players corresponding to each of the plays are the same person, and if they are determined to be the same person, to output play information corresponding to each of a plurality of plays linked to that player. As a result, it is possible to accurately output play information linked to each player based on a same-player determination.

Also, in the prize acquisition game machine 1 according to the embodiments described above, the control unit 15 is configured to change the order in which play information is outputted based on the play history. As a result, it is possible to prioritize display of play information that is more likely to be checked or used by administrators and players.

Also, the prize acquisition game machine 1 according to the embodiments described above further comprises the display unit 9, wherein the control unit 15 is configured to plot a symbol corresponding to movement information on the display unit 9, at a position corresponding to movement information on an image representing the game space S. As a result, play information linked to the player can be easily checked.

The present invention is not limited to or by the embodiments described above, and suitable design changes made to the above embodiments by a person skilled in the art are also encompassed by the scope of the present invention as long as they still have the features of the present invention. That is, the elements of the embodiments described above, as well as their arrangement, material, condition, shape, size, and the like, are not limited to the examples and may be changed as needed. Also, the elements of the embodiments described above can be combined to an extent that this is technically possible, and these combinations are also encompassed by the scope of the present invention as long as they still have the features of the present invention.

REFERENCE SIGNS LIST

1 . . . prize acquisition game machine, 3 . . . prize display unit, 6 . . . prize acquisition unit, 8 . . . operation unit, 9 . . . display unit, 13 . . . storage unit, 15 . . . control unit, 601 . . . specific plane

What is claimed is:

1. A prize acquisition game machine, comprising:

a prize display unit comprising a housing that accommodates prizes in a game space within the housing;

a prize acquisition device comprising arms and that is configured to move around the game space and grab at least one of the prizes with the arms;

a controller that controls movement of the prize acquisition device; and a storage that stores movement information on past movement of the prize acquisition device in the game space, wherein the movement information includes, as coordinate information of a specific point on a movement path corresponding to the past movement, coordinate information on a plurality of points, and the controller is configured to cause the prize acquisition device to move to one of the points selected by a user based on the movement information stored in the storage.

2. The prize acquisition game machine according to claim 1, wherein the controller causes the prize acquisition device to perform planar movement based on a movement request inputted by the user, the planar movement including at least one of a first movement in a first direction and a second movement in a second direction in a specific plane within the game space, and after the planar movement, the prize acquisition device performs a third movement in a third direction approaching the prize.

3. The prize acquisition game machine according to claim 2, wherein the movement information includes, as the coordinate information of the specific point, at least one of:

coordinate information of an approach starting point that is a position of the prize acquisition device after the planar movement has been performed but before the third movement is performed, and coordinate information of a direction change point of the movement in a plurality of directions in the specific plane along which the prize acquisition device has moved, and the controller causes the prize acquisition device to move to the direction change point or the approach starting point based on the one of the coordinate information.

4. The prize acquisition game machine according to claim 3, wherein after the prize acquisition device moves to the specific point, the controller causes the prize acquisition device to move based on the movement request from the user.

5. The prize acquisition game machine according to claim 3, wherein the coordinate information of the specific point is in a coordinate space with a standby position of the prize acquisition device as origin, the coordinate information of the specific point includes:

coordinate information on the standby position, coordinate information on a movement range over which the prize acquisition device can move, and coordinate information on a prize insertion position at which the prize acquired by the prize acquisition device is dropped, and the standby position, the movement range, and the prize insertion position are specified by manually moving the prize acquisition device.

6. The prize acquisition game machine according to claim 1, wherein the movement information includes movement range information on the prize acquisition device, and the controller controls the prize acquisition device to move within a movement range defined by the movement range information.

7. The prize acquisition game machine according to claim 1, further comprising:

an operation part that receives an input to operate the prize acquisition device, wherein the movement information corresponds to the past movement performed by a first method or a second method, in the first method, the prize acquisition device is manually moved, and in the second method, the controller moves the prize acquisition device based on a movement request inputted via the operation part.

8. The prize acquisition game machine according to claim 1, further comprising a drive device that drives the prize acquisition device, wherein the drive device comprises at least one of a position sensor and an encoder that sense a position of the prize acquisition device, and the movement information is acquired based on the at least one of the position sensor and the encoder.

9. A prize acquisition game machine, comprising:

a prize display unit comprising a housing that accommodates prizes in a game space within the housing;

a prize acquisition device comprising arms and that is configured to move around the game space and grab at least one of the prizes with the arms;

a controller that controls movement of the prize acquisition device; and a storage that stores movement information on past movement of the prize acquisition device in the game space, wherein the movement information includes, as coordinate information of a specific point on a movement path corresponding to the past movement, coordinate information on a plurality of points, the controller is configured to:

control the movement of the prize acquisition device based on the movement information stored in the storage, output play information including the movement information and a play history of each of a plurality of plays, and change an output order of the play information based on the play history.

10. The prize acquisition game machine according to claim 9, wherein the controller further:

determines whether players corresponding to the plays are the same person, and when determining that the players are the same person, outputs the play information corresponding to the plays linked to the players.

11. A prize acquisition game machine, comprising:

a prize display unit comprising a housing that accommodates prizes in a game space within the housing;

a prize acquisition device comprising arms and that is configured to move around the game space and grab at least one of the prizes with the arms;

a controller that controls movement of the prize acquisition device;

a storage that stores movement information on past movement of the prize acquisition device in the game space; and a display, wherein the movement information includes, as coordinate information of a specific point on a movement path corresponding to the past movement, coordinate information on a plurality of points, the controller is configured to:

control the movement of the prize acquisition device based on the movement information stored in the storage, output play information including the movement information and a play history of each of a plurality of plays, and plot, on the display, a symbol corresponding to the movement information at a position corresponding to the movement information on an image representing the game space.

* * * * *